US011626106B1

(12) United States Patent
Ping et al.

(10) Patent No.: US 11,626,106 B1
(45) Date of Patent: Apr. 11, 2023

(54) ERROR ATTRIBUTION IN NATURAL LANGUAGE PROCESSING SYSTEMS

(71) Applicant: Amazon Technologies, Inc., Seattle, WA (US)

(72) Inventors: Qing Ping, Santa Clara, CA (US); Govindarajan Sundaram Thattai, Fremont, CA (US); Joel Joseph Chengottusseriyil, San Jose, CA (US); Feiyang Niu, Hayward, CA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/800,622

(22) Filed: Feb. 25, 2020

(51) Int. Cl.
| | | |
|---|---|---|
| *G10L 15/18* | (2013.01) | |
| *G10L 15/02* | (2006.01) | |
| *G10L 15/22* | (2006.01) | |
| *G10L 15/30* | (2013.01) | |
| *G10L 15/197* | (2013.01) | |
| *G10L 13/00* | (2006.01) | |
| *G10L 15/08* | (2006.01) | |

(52) U.S. Cl.
CPC .......... *G10L 15/1815* (2013.01); *G10L 13/00* (2013.01); *G10L 15/02* (2013.01); *G10L 15/197* (2013.01); *G10L 15/22* (2013.01); *G10L 15/30* (2013.01); *G10L 2015/088* (2013.01)

(58) Field of Classification Search
CPC ... G10L 15/1815; G10L 15/02; G10L 15/197; G10L 15/22; G10L 15/30; G10L 13/00; G10L 2015/088
See application file for complete search history.

(56) References Cited

U.S. PATENT DOCUMENTS

| | | | |
|---|---|---|---|
| 9,953,637 B1 * | 4/2018 | Di Fabbrizio | G10L 15/22 |
| 9,972,339 B1 * | 5/2018 | Sundaram | G10L 25/78 |
| 10,515,625 B1 * | 12/2019 | Metallinou | G10L 15/26 |
| 2014/0297252 A1 * | 10/2014 | Prasad | G10L 15/01 |
| | | | 704/2 |
| 2017/0083285 A1 * | 3/2017 | Meyers | G10L 15/32 |
| 2018/0096678 A1 * | 4/2018 | Zhou | G10L 15/22 |
| 2018/0137855 A1 * | 5/2018 | Lee | G10L 15/063 |
| 2019/0371296 A1 * | 12/2019 | Iwase | G10L 15/30 |
| 2020/0004616 A1 * | 1/2020 | Natsumeda | G06N 3/08 |
| 2021/0117779 A1 * | 4/2021 | Lin | G06K 9/6271 |

* cited by examiner

*Primary Examiner* — Bhavesh M Mehta
*Assistant Examiner* — Darioush Agahi
(74) *Attorney, Agent, or Firm* — Pierce Atwood LLP

(57) ABSTRACT

A system is provided for determining which component of a speech processing system is the cause of an undesired response to a user input. The system processes ASR data and NLU data to determine the component likely to cause the undesired response. Based on which component is the cause of the undesired response, the system performs an appropriate conversation recovery technique to confirm the speech processing results with the user.

20 Claims, 11 Drawing Sheets

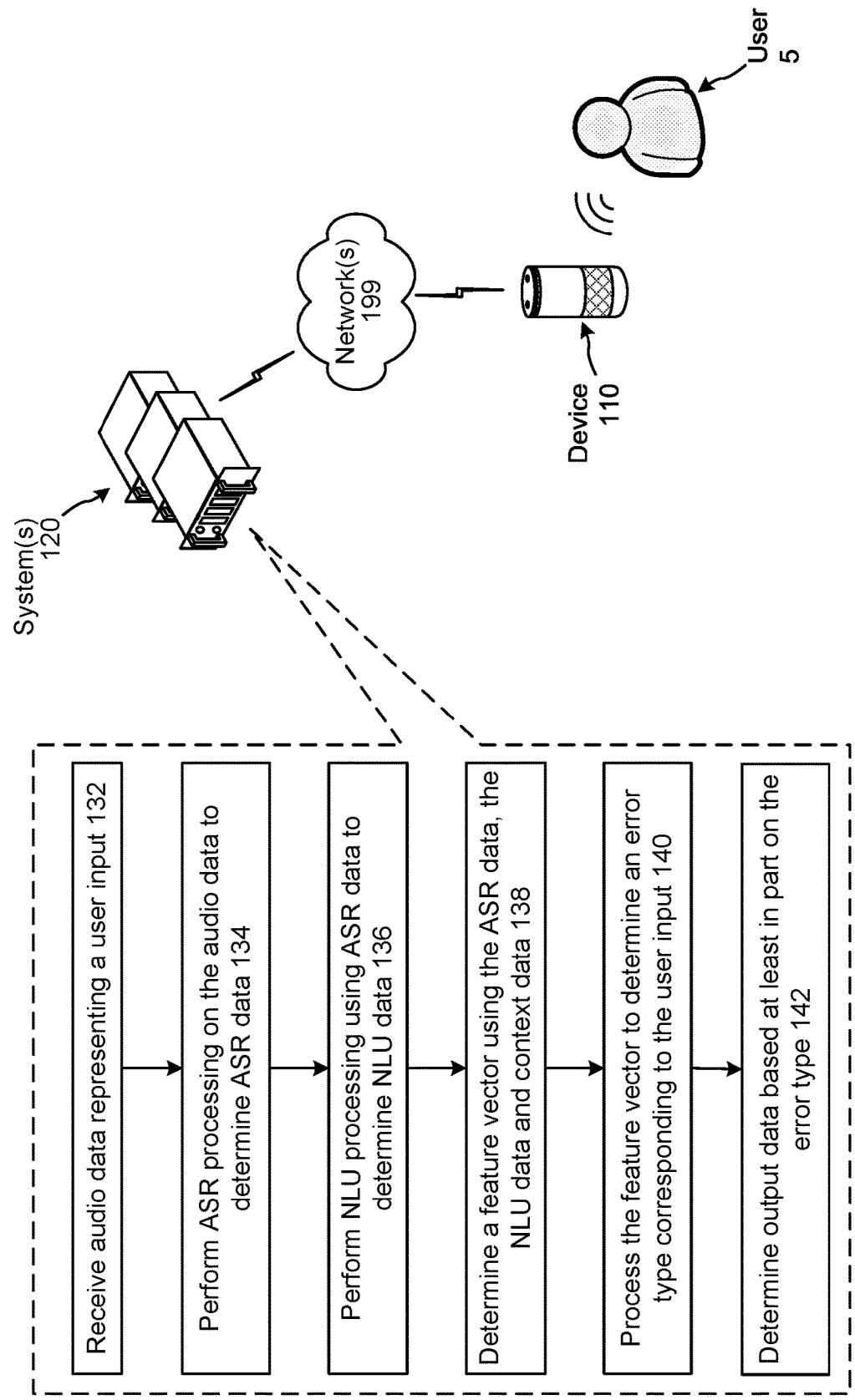

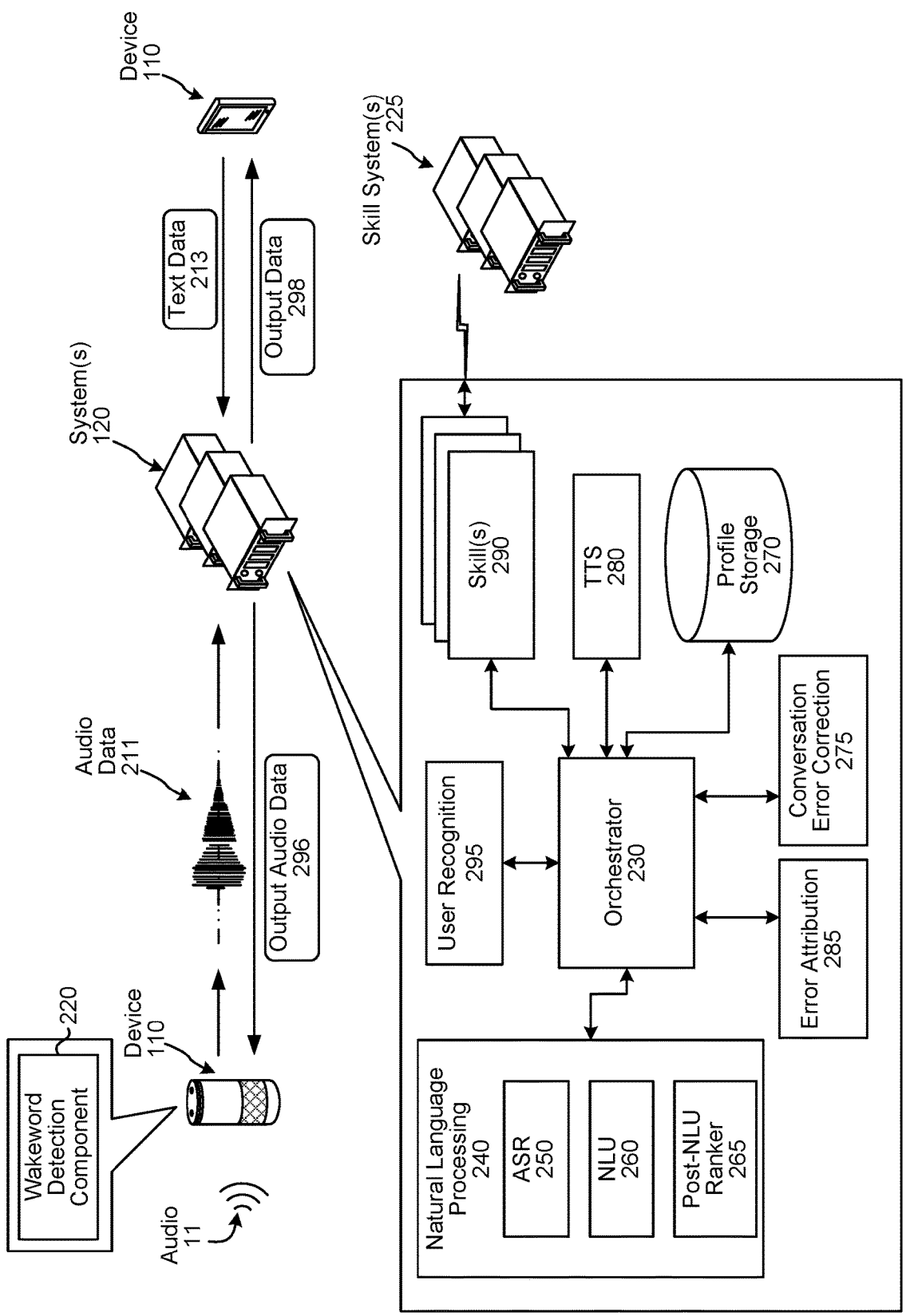

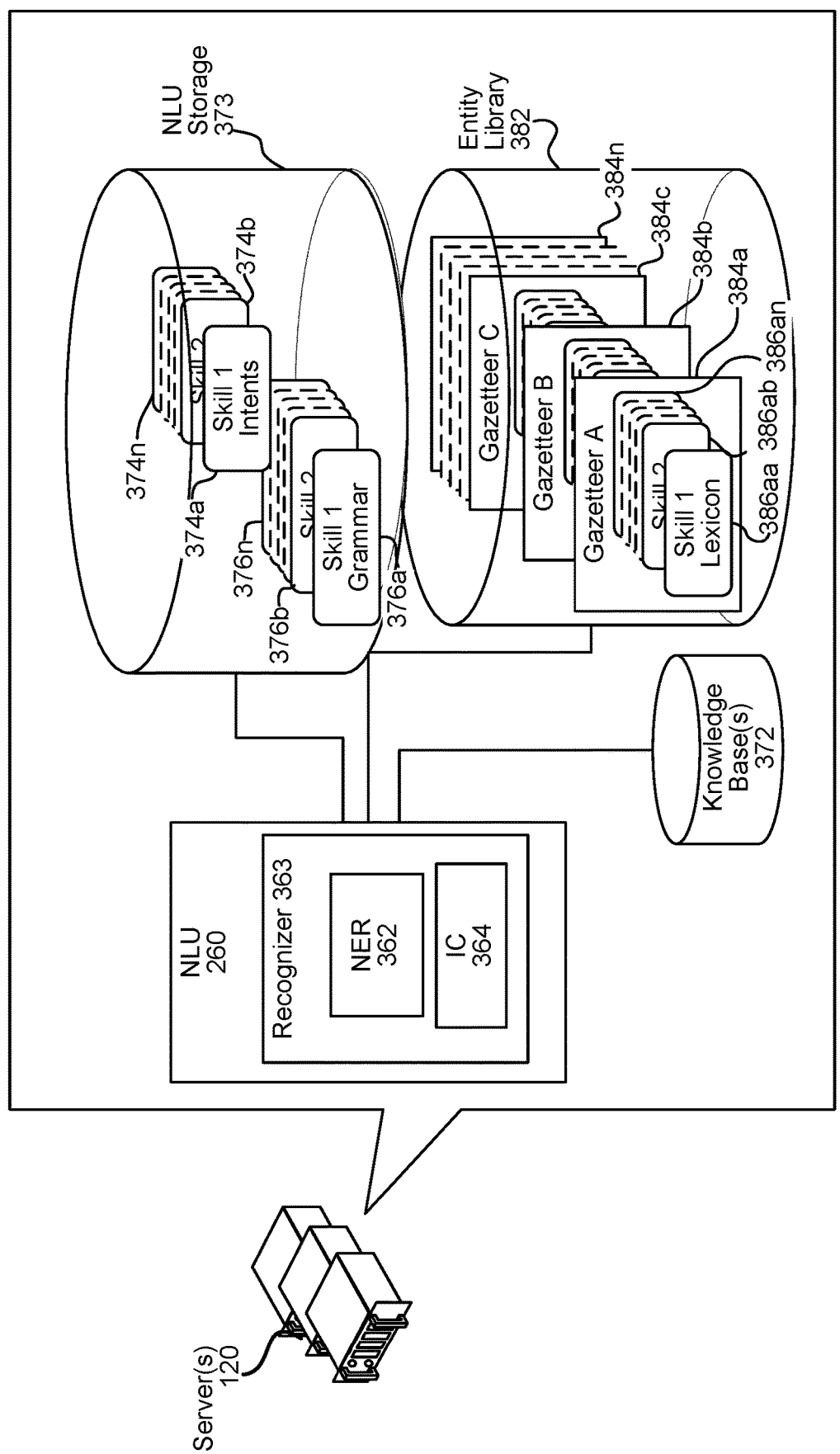

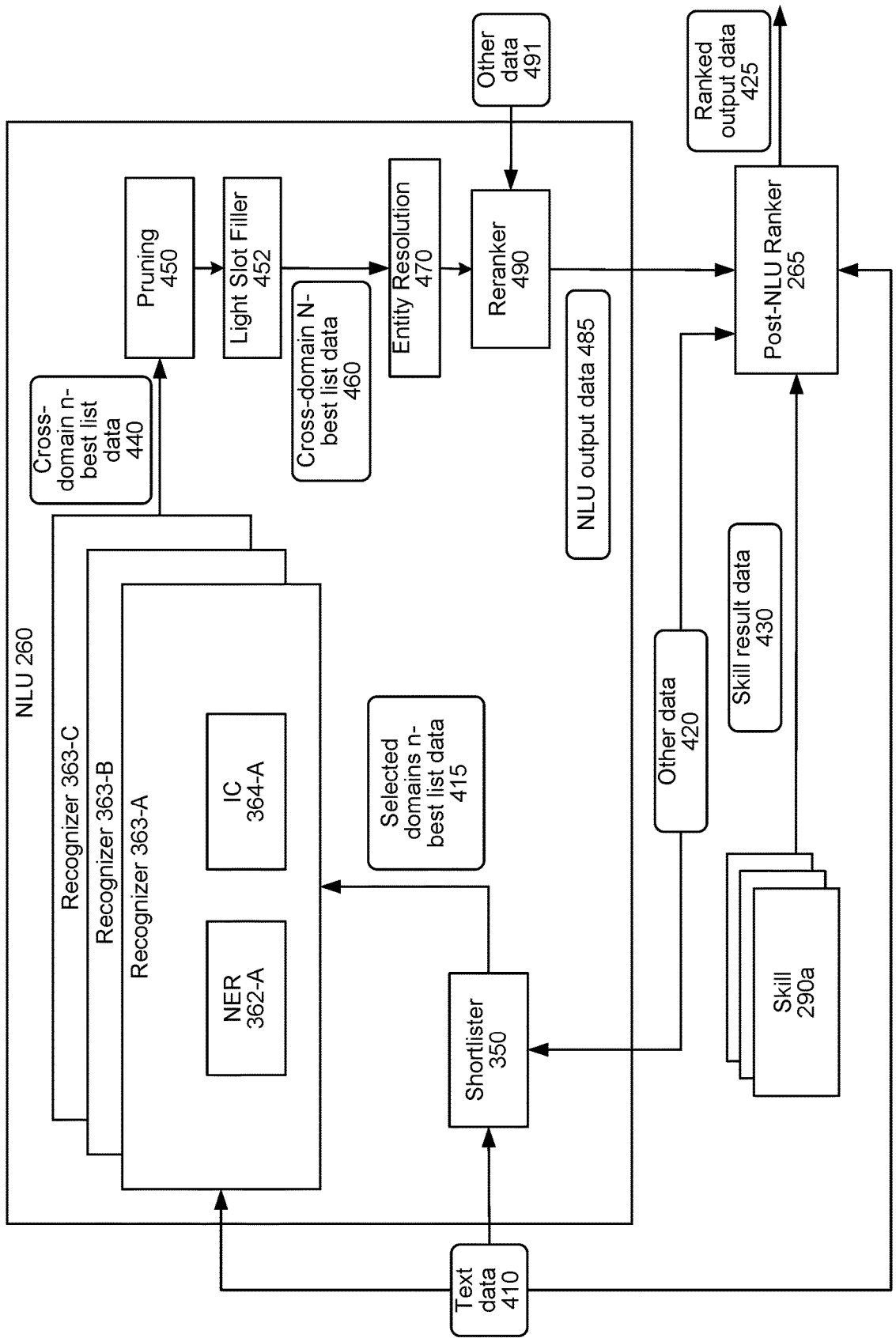

US 11,626,106 B1

ERROR ATTRIBUTION IN NATURAL LANGUAGE PROCESSING SYSTEMS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to determine an error type corresponding to processing of a user input according to embodiments of the present disclosure.

FIG. 2A is a conceptual diagram of components of a system according to embodiments of the present disclosure.

FIG. 3 is a conceptual diagram illustrating how natural language understanding processing is performed according to embodiments of the present disclosure.

FIG. 4 is a conceptual diagram illustrating how NLU processing may be performed according to embodiments of the present disclosure.

DETAILED DESCRIPTION

Figure 2B:
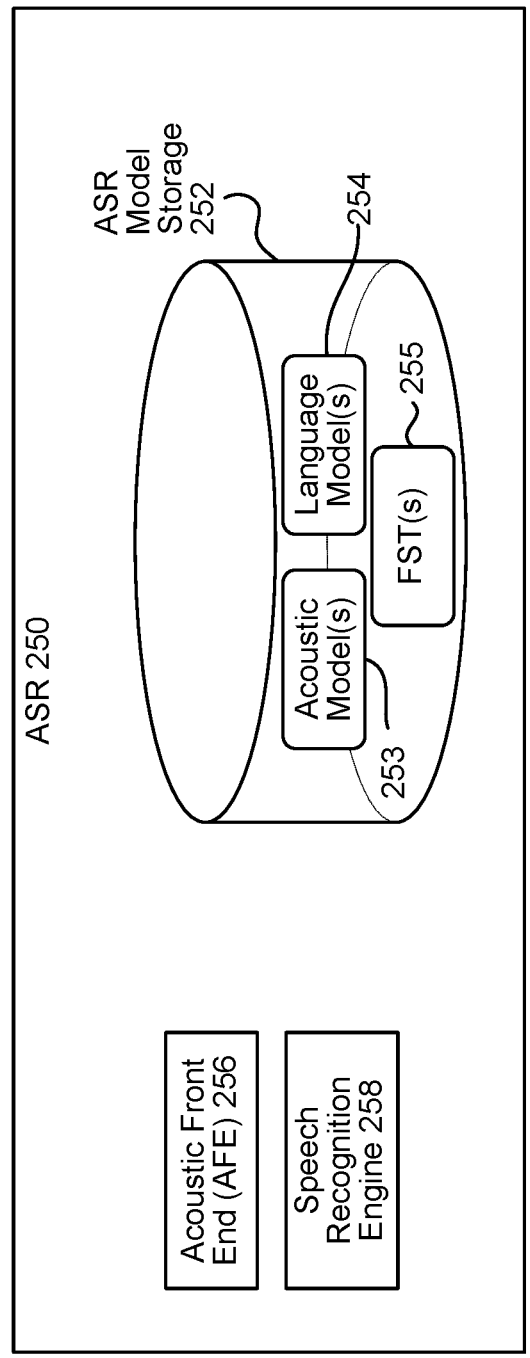
FIG. 2B is a conceptual diagram of automatic speech recognition components according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may receive a user input as speech. For example, a user may speak an input to a device. The device may send audio data, representing the spoken input, to the system. The system may perform ASR processing on the audio data to generate text data representing the user input. The system may perform NLU processing on the text data to determine an intent of the user input as well as portions of the text data that may be used to perform an action responsive to the user input. For various reasons the system may not produce the user's desired output/response. For example, the system may respond "I am sorry, I cannot help you with that". In other cases, the system may not respond at all. In yet other cases, the system may generate an output that does not correspond to the user input. For example, a user may request the system to play a song or a movie, and the system may respond by playing a song or movie different from what was requested by the user. Such undesired responses may be the result of erroneous processing by one or more components of the system. In some cases, a processing error may be propagated to other components in the system causing the other components to generate an error also or generate an undesired result. Determining which component of the system is the root cause of the error for a particular user input enables developers to retrain the appropriate component to reduce undesired results.

The present disclosure relates to determining which component of the system is the root cause of the error for a particular user input. The present disclosure provides a system that classifies a user input into one of the defined error types that corresponds to a particular system component. For example, one of the error types may indicate an error in ASR processing, another error type may indicate an error in determining the intent of the user input, and yet another error type may indicate an error in determining the entity represented in the user input.

The teachings of the present disclosure may provide a more desirable user experience. This is due, at least in part, to the fact that the present disclosure's teachings decrease a frequency at which undesired actions are performed by a system. By decreasing the instances of such actions being performed, user/system interactions may be improved. The teachings of the present disclosure may also be used by system engineers to identify and improve system components that are causing the undesired actions.

FIG. 1 illustrates a system configured to determine an error type corresponding to a user input according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1, the system may include device 110 local to a user 5, in communication with one or more systems 120 across one or more networks 199.

The system(s) 120 receives (132) audio data representing a user input. The audio data may include a user input/utterance spoken by the user 5 and captured by the device 110. The system(s) 120 performs natural language processing using the audio data to determine natural language processing (NLP) data. In particular, the system(s) 120 performs (134) automatic speech recognition (ASR) processing on the audio data to determine ASR data corresponding to the user input. As described below, the system(s) 120 may determine ASR data that includes an ASR N-best list including multiple ASR hypotheses and corresponding confidence scores representing what the user may have said. The ASR hypotheses may be text data determined by an ASR component (e.g., ASR component 250) as representing the input utterance. The confidence score of each ASR hypothesis may indicate the ASR component's level of confidence that the corresponding text data represents what the user said. The ASR component may also determine token scores corresponding to each token/word of the ASR hypothesis, where the token score indicates the ASR component's level of confidence that the respective token/word was spoken by the user. The token scores may be identified as a slot score when the corresponding token relates to a slot. The token scores may be identified as an entity score when the corresponding token relates to an entity.

The system(s) 120 performs (136) natural language understanding (NLU) processing on one or more ASR hypotheses to determine NLU data. In some embodiments, the system(s) 120 may select the top ASR hypothesis to perform NLU processing. In other embodiments, the system(s) 120 may select more than one ASR hypothesis for NLU processing. As described below, the system(s) 120 may determine NLU data that includes an NLU N-best list including multiple NLU hypotheses and corresponding confidence scores. The NLU N-best list may be determined by a NLU component (e.g., NLU component 260) that may include various other components, such as, intent classification, slot tagger, entity recognizer, etc. As described below, the NLU data may include an intent corresponding to the user input, one or more slot labels identifying parts of the user input (such as, noun, city name, place, artist name, song name, etc.), and entity names represented in the user input (such as, the name of the artist, the name of the song, the name of the city, etc.). The NLP data includes the ASR data, the NLU data and other data determined by the various components of the system(s) 120 described in detail in relation to FIGS. 2A, 2B, 3, 4 and 5.

The system(s) 120 determines (138) a feature vector using at least the ASR data, the NLU data and context data. The feature vector may represent data determined during natural language processing of the user input. The feature vector may also represent other data related to the audio data and the user input determined by the system(s) 120. For example, the feature vector may include base features (e.g., utterance score, ASR token count, dialog outcome, etc.), ASR boosting features (e.g., ASR confidence score(s), ASR slot token score(s), ASR entity token score(s), etc.), intent boosting features (e.g., NLU confidence score(s), intent score(s), domain(s), etc.), slot boosting features (e.g., slot count, NLU slot score(s), etc.), entity recognition boosting features (e.g., NLU entity score(s), etc.) and other features (e.g., friction type). The feature vector may also include features representing context data, where the context data may include dialog session data, historical information from the present user interaction, historical information from previous user interactions, device type information, on-screen entities (such as content titles, actors, locations, etc. being shown on a screen and displayed to a user), information from active skill(s), and other contextual data. In some embodiments, the feature vector may include approximately 300 features.

The system(s) 120 processes (140) the feature vector to determine an error type corresponding to the user input. The system(s) 120 may use a trained model to process the feature vector, where the trained model may be configured to classify the user input into one of the defined error types. In some embodiments, the trained model may be configured to classify the user input into the following error types: endpoint error, ASR error, intent error, slot error, entity error, confirmation error and result error. Details on these error types are described in relation to FIG. 6.

The system(s) 120 determines (142) output data based at least in part on the error type. In some embodiments, the system(s) 120 may perform a particular conversation recovery technique based on the error type. In some embodiments, if the error type is an ASR error, then the system(s) 120 may generate output audio requesting the user 5 to repeat the user input/utterance. For example, the system(s) 120 may generate output text data representing a request to repeat the utterance, such as "I am sorry, can you please repeat that?" The system(s) 120 may process the output text data using TTS processing to determine output audio data representing synthesized speech, and may send the output audio data to the device 110 for presentation/playback to the user 5. The user 5 may repeat the user input/utterance, and the device 110 may capture/receive second audio data, that can be processed by the ASR component to attempt to determine what the user said. In some cases, the second audio data may be of better quality, or the user 5 may have rephrased the initial user input, and this may enable the system(s) 120 to accurately determine what the user said or provide the system(s) 120 a second chance to determine what the user said.

In some embodiments, if the error type is an intent error, then the system(s) 120 may generate output audio representing a rephrase of the user input and confirm with the user 5 to proceed with the rephrased input. The system(s) 120 may determine an alternate input that is similar to the user input, generate output text data representing the alternate input, process the output text data using TTS processing to determine output audio data representing synthesized speech, and may send the output audio data to the device 110 for presentation/playback to the user 5. For example, the user input may be "Alexa, go to my Spotify", and the system(s) 120 may determine a rephrased input of "play my Spotify." The system(s) 120 may output audio "Did you mean 'play my Spotify'?" to confirm the rephrased input with the user 5, and the user 5 may respond by saying "yes."

In some embodiments, if the error type is an entity error, then the system(s) 120 may generate output audio to confirm the entity with the user 5. For example, the user input may be "play songs by MJ." The system(s) 120 may determine to confirm with the user 5 that the artist name is Michael Jackson, therefore, the system(s) 120 may output audio "Do you want me to play songs by Michael Jackson?"

The system may operate using various components as illustrated in FIG. 2A. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a natural language processing component 240. An ASR component 250 of the natural language processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the server(s) 120. Upon receipt by the server(s) 120, the text data 213 may be sent to the orchestrator component 230, which may send the text data 213 to the NLU component 260.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights,"

the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

The natural language processing component 240 may include a post-NLU ranker 265 that receives NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

A "domain" may include various skills relating to a particular area of interest. For example, a music domain may include various skills that can respond to a user's request to play music, enable a user to purchase music, etc. Such skills may be the Amazon Music skill, the Pandora skill, the Spotify skill, etc. In another example, a smart-home domain may include skills that enable a user to control various home devices. Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may include a user-recognition component 295 that recognizes one or more users associated with data input to the system. The user-recognition component 295 may take as input the audio data 211 and/or text data output by the ASR component 250. The user-recognition component 295 may perform user recognition by comparing audio characteristics in the input audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The ASR engine 258 may return an N-best list of paths along with their respective recognition scores, corresponding to the top N paths as determined by the ASR engine 258. An application (such as a program or component either internal or external to the ASR component 250 that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

The system(s) 120 may also include the error attribution component 285. The error attribution component 285 may be configured to process data generated by the natural language processing component 240 to determine which component of the speech processing system contributed to an undesired result to a user input. Details of the error attribution component 285 are described in relation to FIG. 6.

The system(s) 120 may also include a conversation error correction component 275. The conversation error correction component 275 may be configured to perform certain functionalities based on the error type determined by the error attribution component 285 to enable the system(s) 120 to generate the desired result for the user input. For example, the conversation error correction component 275 may determine to confirm with the user certain data/features determined by the natural language processing component 240.

The system(s) 120 may send output audio data 296 representing synthesized speech generated using the TTS component 280 to the device 110 in response to the user input represented by audio data 211. The system(s) 120 may send output data 298 (text data or graphical user interface data) to the device 110 in response to the user input represented by the text data 213. The output audio data 296 and the output data 298 may represent a system-generated response determined by the conversation error correction component 275.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the MINI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by ASR engine 258 for recognizing speech according to some aspects of the present disclosure. A word result network may consist of sequences of words that may be recognized and the likelihood of each sequence. The likelihood of any path in the word result network may be determined by an acoustic model and a language model.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different domain (e.g., smart home, video, music, weather, custom, etc.). Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a domain. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular domain to which the grammar model 376 relates, whereas the lexical information 386 is personalized to the user and/or the device 110 from which the user input originated. For example, a grammar model 376 associated with a shopping domain may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 373 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 373.

The intents identifiable by a specific IC component 364 are linked to domain-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

The shortlister component 350 may receive text data 410 output from the ASR component 250 or output from the device 110b (as illustrated in FIG. 4). The ASR component 250 may embed the text data 410 into a form processable by a trained model(s) using sentence embedding techniques as known in the art. Sentence embedding results in the text data 410 including text in a structure that enables the trained models of the shortlister component 450 to operate on the text data 410. For example, an embedding of the text data 410 may be a vector representation of the text data 410.

The shortlister component 350 may make binary determinations (e.g., yes or no) regarding which domains relate to the text data 410. The shortlister component 350 may make such determinations using the one or more trained models described herein above. If the shortlister component 350 implements a single trained model for each domain, the shortlister component 350 may simply run the models that are associated with enabled domains as indicated in a user profile associated with the device 110 and/or user that originated the user input.

The shortlister component 350 may generate n-best list data 415 representing domains that may execute with respect to the user input represented in the text data 410. The size of the n-best list represented in the n-best list data 415 is configurable. In an example, the n-best list data 415 may indicate every domain of the system as well as contain an indication, for each domain, regarding whether the domain is likely capable to execute the user input represented in the text data 410. In another example, instead of indicating every domain of the system, the n-best list data 415 may only indicate the domains that are likely to be able to execute the user input represented in the text data 410. In yet another example, the shortlister component 350 may implement thresholding such that the n-best list data 415 may indicate no more than a maximum number of domains that may execute the user input represented in the text data 410. In an example, the threshold number of domains that may be represented in the n-best list data 415 is ten. In another example, the domains included in the n-best list data 415 may be limited by a threshold a score, where only domains indicating a likelihood to handle the user input is above a certain score (as determined by processing the text data 410 by the shortlister component 350 relative to such domains) are included in the n-best list data 415.

The text data 410 may correspond to more than one ASR hypothesis. When this occurs, the shortlister component 350 may output a different n-best list (represented in the n-best list data 415) for each ASR hypothesis. Alternatively, the shortlister component 350 may output a single n-best list representing the domains that are related to the multiple ASR hypotheses represented in the text data 410.

As indicated above, the shortlister component 350 may implement thresholding such that an n-best list output therefrom may include no more than a threshold number of entries. If the text data 410 includes more than one ASR hypothesis, the n-best list output by the shortlister component 350 may include no more than a threshold number of entries irrespective of the number of ASR hypotheses output by the ASR component 250. Alternatively or in addition, the n-best list output by the shortlister component 350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the text data 410, the shortlister component 350 may generate confidence scores representing likelihoods that domains relate to the text data 410. If the shortlister component 350 implements a different trained model for each domain, the shortlister component 350 may generate a different confidence score for each individual domain trained model that is run. If the shortlister component 350 runs the models of every domain when text data 410 is received, the shortlister component 350 may generate a different confidence score for each domain of the system. If the shortlister component 350 runs the models of only the domains that are associated with skills indicated as enabled in a user profile associated with the device 110 and/or user that originated the user input, the shortlister component 350 may only generate a different confidence score for each domain associated with at least one enabled skill. If the shortlister component 350 implements a single trained model with domain specifically trained portions, the shortlister component 350 may generate a different confidence score for each domain who's specifically trained portion is run. The shortlister component 350 may perform matrix vector modification to obtain confidence scores for all domains of the system in a single instance of processing of the text data 410.

N-best list data 415 including confidence scores that may be output by the shortlister component 350 may be represented as, for example:

Search domain, 0.67
Recipe domain, 0.62
Information domain, 0.57
Shopping domain, 0.42

As indicated, the confidence scores output by the shortlister component 350 may be numeric values. The confidence scores output by the shortlister component 350 may alternatively be binned values (e.g., high, medium, low).

The n-best list may only include entries for domains having a confidence score satisfying (e.g., equaling or exceeding) a minimum threshold confidence score. Alternatively, the shortlister component 350 may include entries for all domains associated with user enabled skills, even if one or more of the domains are associated with confidence scores that do not satisfy the minimum threshold confidence score.

The shortlister component 350 may consider other data 420 when determining which domains may relate to the user input represented in the text data 410 as well as respective confidence scores. The other data 420 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 420 may include an indicator of the user associated with the text data 410, for example as determined by the user recognition component 295.

The other data 420 may be character embedded prior to being input to the shortlister component 350. The other data 420 may alternatively be embedded using other techniques known in the art prior to being input to the shortlister component 350.

The other data 420 may also include data indicating the domains associated with skills that are enabled with respect to the device 110 and/or user that originated the user input. The shortlister component 350 may use such data to determine which domain-specific trained models to run. That is, the shortlister component 350 may determine to only run the trained models associated with domains that are associated with user-enabled skills. The shortlister component 350 may alternatively use such data to alter confidence scores of domains.

As an example, considering two domains, a first domain associated with at least one enabled skill and a second domain not associated with any user-enabled skills of the user that originated the user input, the shortlister component 350 may run a first model specific to the first domain as well as a second model specific to the second domain. Alternatively, the shortlister component 350 may run a model configured to determine a score for each of the first and second domains. The shortlister component 350 may determine a same confidence score for each of the first and second domains in the first instance. The shortlister component 350 may then alter those confidence scores based on which domains is associated with at least one skill enabled by the present user. For example, the shortlister component 350 may increase the confidence score associated with the domain associated with at least one enabled skill while leaving the confidence score associated with the other domain the same. Alternatively, the shortlister component 350 may leave the confidence score associated with the domain associated with at least one enabled skill the same while decreasing the confidence score associated with the other domain. Moreover, the shortlister component 350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 350 receives the text data 410, the shorlister component 350 may determine whether profile data associated with the user and/or device 110 that originated the command includes an indication of enabled skills.

The other data 420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such data to determine which domain-specific trained models to run. For example, if the device 110 corresponds to a displayless type device, the shortlister component 350 may determine not to run trained models specific to domains that output video data. The shortlister component 350 may alternatively use such data to alter confidence scores of domains.

As an example, considering two domains, one that outputs audio data and another that outputs video data, the shortlister component 350 may run a first model specific to the domain that generates audio data as well as a second model specific to the domain that generates video data. Alternatively the shortlister component 350 may run a model configured to determine a score for each domain. The shortlister component 350 may determine a same confidence score for each of the domains in the first instance. The shortlister component 350 may then alter the original confidence scores based on the type of the device 110 that originated the user input corresponding to the text data 410. For example, if the device 110 is a displayless device, the shortlister component 350 may increase the confidence score associated with the domain that generates audio data while leaving the confidence score associated with the domain that generates video data the same. Alternatively, if the device 110 is a displayless device, the shortlister component 350 may leave the confidence score associated with the domain that generates audio data the same while decreasing the confidence score associated with the domain that generates video data. Moreover, if the device 110 is a displayless device, the shortlister component 350 may increase the confidence score associated with the domain that generates audio data as well as decrease the confidence score associated with the domain that generates video data.

The type of device information represented in the other data 420 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 420 may represent the smart TV of other display device, and not the displayless device that captured the spoken user input.

The other data 420 may also include data indicating the user input originating device's speed, location, or other mobility information. For example, the device may correspond to a vehicle including a display. If the vehicle is moving, the shortlister component 350 may decrease the confidence score associated with a domain that generates video data as it may be undesirable to output video content to a user while the user is driving. The device may output data to the system(s) 120 indicating when the device is moving.

The other data 420 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 350 may use such data to alter confidence scores of domains. For example, the shortlister component 350 may run a first model specific to a first domain as well as a second model specific to a second domain. Alternatively, the shortlister component 350 may run a model configured to determine a score for each domain. The shortlister component 350 may also determine a same confidence score for each of the domains in the first instance. The shortlister component 350 may then alter the original confidence scores based on the first domain being invoked to cause the system to output content while the current user input was received. Based on the first domain being invoked, the shortlister component 350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 415 generated by the shortlister component 350 as well as the different types of other data 420 considered by the shortlister component 350 are configurable. For example, the shortlister component 350 may update confidence scores as more other data 420 is considered. For further example, the n-best list data 415 may exclude relevant domains if thresholding is implemented. Thus, for example, the shortlister component 350 may include an indication of a domain in the n-best list 415 unless the shortlister component 350 is one hundred percent confident that the domain may not execute the user input represented in the text data 410 (e.g., the shortlister component 350 determines a confidence score of zero for the domain).

The shortlister component 350 may send the text data 410 to recognizers 363 associated with domains represented in the n-best list data 415. Alternatively, the shortlister component 350 may send the n-best list data 415 or some other indicator of the selected subset of domains to another component (such as the orchestrator component 230) which may in turn send the text data 410 to the recognizers 363 corresponding to the domains included in the n-best list data 415 or otherwise indicated in the indicator. If the shortlister component 350 generates an n-best list representing domains without any associated confidence scores, the shortlister component 350/orchestrator component 230 may send the text data 410 to recognizers 363 associated with domains that the shortlister component 350 determines may execute the user input. If the shortlister component 350 generates an n-best list representing domains with associated confidence scores, the shortlister component 350/orchestrator component 230 may send the text data 410 to recognizers 363 associated with domains associated with confidence scores satisfying (e.g., meeting or exceeding) a threshold minimum confidence score.

A recognizer 363 may output tagged text data generated by an NER component 362 and an IC component 364, as described herein above. The NLU component 260 may compile the output tagged text data of the recognizers 363 into a single cross-domain n-best list 440 and may send the cross-domain n-best list 440 to a pruning component 450. Each entry of tagged text (e.g., each NLU hypothesis) represented in the cross-domain n-best list data 440 may be associated with a respective score indicating a likelihood that the NLU hypothesis corresponds to the domain associated with the recognizer 363 from which the NLU hypothesis was output. For example, the cross-domain n-best list data 440 may be represented as (with each line corresponding to a different NLU hypothesis):

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 may sort the NLU hypotheses represented in the cross-domain n-best list data 440 according to their respective scores. The pruning component 450 may perform score thresholding with respect to the cross-domain NLU hypotheses. For example, the pruning component 450 may select NLU hypotheses associated with scores satisfying (e.g., meeting and/or exceeding) a threshold score. The pruning component 450 may also or alternatively perform number of NLU hypothesis thresholding. For example, the pruning component 450 may select the top scoring NLU hypothesis(es). The pruning component 450 may output a portion of the NLU hypotheses input thereto. The purpose of the pruning component 450 is to create a reduced list of NLU hypotheses so that downstream, more resource intensive, processes may only operate on the NLU hypotheses that most likely represent the user's intent.

The NLU component 260 may include a light slot filler component 452. The light slot filler component 452 can take text from slots represented in the NLU hypotheses output by the pruning component 450 and alter them to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain n-best list data 460.

The cross-domain n-best list data 460 may be input to an entity resolution component 470. The entity resolution component 470 can apply rules or other instructions to standardize labels or tokens from previous stages into an intent/slot representation. The precise transformation may depend on the domain. For example, for a travel domain, the entity resolution component 470 may transform text corresponding to "Boston airport" to the standard BOS three-letter code referring to the airport. The entity resolution component 470 can refer to a knowledge base that is used to specifically identify the precise entity referred to in each slot of each NLU hypothesis represented in the cross-domain n-best list data 460. Specific intent/slot combinations may also be tied to a particular source, which may then be used to resolve the text. In the example "play songs by the stones," the entity resolution component 470 may reference a personal music catalog, Amazon Music account, a user profile, or the like. The entity resolution component 470 may output an altered n-best list that is based on the cross-domain n-best list 460 but that includes more detailed information (e.g., entity IDs) about the specific entities mentioned in the slots and/or more detailed slot data that can eventually be used by a skill. The NLU component 260 may include multiple entity resolution components 470 and each entity resolution component 470 may be specific to one or more domains.

The NLU component 260 may include a reranker 490. The reranker 490 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 470.

The reranker 490 may apply re-scoring, biasing, or other techniques. The reranker 490 may consider not only the data output by the entity resolution component 470, but may also consider other data 491. The other data 491 may include a variety of information. For example, the other data 491 may include skill rating or popularity data. For example, if one skill has a high rating, the reranker 490 may increase the score of a NLU hypothesis that may be processed by the skill. The other data 491 may also include information about skills that have been enabled by the user that originated the user input. For example, the reranker 490 may assign higher scores to NLU hypothesis that may be processed by enabled skills than NLU hypothesis that may be processed by non-enabled skills. The other data 491 may also include data indicating user usage history, such as if the user that originated the user input regularly uses a particular skill or does so at particular times of day. The other data 491 may additionally include data indicating date, time, location, weather, type of device 110, user identifier, context, as well as other information. For example, the reranker 490 may consider when any particular skill is currently active (e.g., music being played, a game being played, etc.).

As illustrated and described, the entity resolution component 470 is implemented prior to the reranker 490. The entity resolution component 470 may alternatively be implemented after the reranker 490. Implementing the entity resolution component 470 after the reranker 490 limits the NLU hypotheses processed by the entity resolution component 470 to only those hypotheses that successfully pass through the reranker 490.

The reranker 490 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 125. In an example, the shortlister component 350 may only process with respect to these latter domains. Results of these two NLU processing paths may be merged into NLU output data 485, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 485, skill result data 430, and the other data 420 in order to output ranked output data 425. The ranked output data 425 may include an n-best list where the NLU hypotheses in the NLU results data 485 are reordered such that the n-best list in the ranked output data 425 represents a prioritized list of skills to respond to a user input as determined by the post-NLU ranker 265. The ranked output data 425 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 485 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 430 based on the first NLU hypothesis and the second NLU hypothesis, respectively. For example, the post-NLU ranker 265 may send the first NLU hypothesis to the first skill 290*a* along with a request for the first skill 290*a* to at least partially execute with respect to the first NLU hypothesis. The post-NLU ranker 265 may also send the second NLU hypothesis to the second skill 290*b* along with a request for the second skill 290*b* to at least partially execute with respect to the second NLU hypothesis. The post-NLU ranker 265 receives, from the first skill 290*a*, first result data 430*a* generated from the first skill 290*a*'s execution with respect to the first NLU hypothesis. The post-NLU ranker 265 also receives, from the second skill 290*b*, second results data 430*b* generated from the second skill 290*b*'s execution with respect to the second NLU hypothesis.

The result data 430 may include various portions. For example, the result data 430 may include content (e.g., audio data, text data, and/or video data) to be output to a user. The result data 430 may also include a unique identifier used by the system(s) 120 and/or the skill system(s) 125 to locate the data to be output to a user. The result data 430 may also include an instruction. For example, if the user input corresponds to "turn on the light," the result data 430 may include an instruction causing the system to turn on a light associated with a profile of the device (110*a*/110*b*) and/or user.

The post-NLU ranker 265 may consider the first result data 430*a* and the second result data 430*b* to alter the first confidence score and the second confidence score of the first NLU hypothesis and the second NLU hypothesis, respectively. That is, the post-NLU ranker 265 may generate a third confidence score based on the first result data 430*a* and the first confidence score. The third confidence score may correspond to how likely the post-NLU ranker 265 determines the first skill will correctly respond to the user input. The post-NLU ranker 265 may also generate a fourth confidence score based on the second result data 430*b* and the second confidence score. One skilled in the art will appreciate that a first difference between the third confidence score and the fourth confidence score may be greater than a second difference between the first confidence score and the second confidence score. The post-NLU ranker 265 may also consider the other data 420 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 430 associated with the skill 290 with the highest altered confidence score to be the data output in response to the current user input. The post-NLU ranker 265 may also consider the text data 410 to alter the NLU hypotheses confidence scores.

The orchestrator component 230 may, prior to sending the NLU results data 485 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 485, including NLU hypotheses paired with skills 290, to the post-NLU ranker 265. In response to text data 410 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 485, to provide result data 430 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 430. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 430 indicating slots of a framework that the skill 290 further needs filled or entities that the skill 290 further needs resolved prior to the skill 290 being able to provided result data 430 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 430 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 430 provided by the skills 290 to alter the NLU processing confidence scores generated by the reranker 490. That is, the post-NLU ranker 265 uses the result data 430 provided by the queried skills 290 to create larger differences between the NLU processing confidence scores generated by the reranker 490. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 430 responsive to NLU hypotheses over skills 290 that provide result data 430 corresponding to an indication that further information is needed, as well as skills 290 that provide result data 430 indicating they can provide multiple responses to received NLU hypotheses. For example, the post-NLU ranker 265 may generate a first score for a first skill 290a that is greater than the first skill's NLU confidence score based on the first skill 290a providing result data 430a including a response to a NLU hypothesis. For further example, the post-NLU ranker 265 may generate a second score for a second skill 290b that is less than the second skill's NLU confidence score based on the second skill 290b providing result data 430b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 430c indicating the third skill 290c can provide multiple responses to a NLU hypothesis.

The post-NLU ranker 265 may consider other data 420 in determining scores. The other data 420 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 420 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 485, the post-NLU ranker 265 may determine whether profile data, associated with the user and/or device that originated the user input, includes indications of enabled skills.

The other data 420 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 420 may include information indicating the veracity of the result data 430 provided by a skill 290. For example, if a user says "tell me a recipe for pasta sauce," a first skill 290a may provide the post-NLU ranker 265 with first result data 430a corresponding to a first recipe associated with a five star rating and a second skill 290b may provide the post-NLU ranker 265 with second result data 430b corresponding to a second recipe associated with a one star rating. In this situation, the post-NLU ranker 265 may increase the NLU processing confidence score associated with the first skill 290a based on the first skill 290a providing the first result data 430a associated with the five star rating and/or decrease the NLU processing confidence score associated with the second skill 290b based on the second skill 290b providing the second result data 430b associated with the one star rating.

The other data 420 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 420 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oreg. A second skill 290b may operate with respect to trains that arrive at, depart from, and pass through Portland, Me. If the device and/or user that originated the user input is located in Seattle, Wash., the post-NLU ranker 265 may increase the NLU processing confidence score associated with the first skill 290a and/or decrease the NLU processing confidence score associated with the second skill 290b. Likewise, if the device and/or user that originated the user input is located in Boston, Mass., the post-NLU ranker 265 may increase the NLU processing confidence score associated with the second skill 290b and/or decrease the NLU processing confidence score associated with the first skill 290a.

The other data 420 may include information indicating a time of day. The system may be configured with skills 290 that operate with respect to certain times of day. For example, a user may provide a user input corresponding to "order me food." A first skill 290a may generate first result data 430a corresponding to breakfast. A second skill 290b may generate second result data 430b corresponding to dinner. If the system(s) 120 receives the user input in the morning, the post-NLU ranker 265 may increase the NLU processing confidence score associated with the first skill 290a and/or decrease the NLU processing score associated with the second skill 290b. If the system(s) 120 receives the user input in the afternoon or evening, the post-NLU ranker 265 may increase the NLU processing confidence score associated with the second skill 290b and/or decrease the NLU processing confidence score associated with the first skill 290a.

The other data 420 may include information indicating user preferences. The system may include multiple skills 290 configured to execute in substantially the same manner. For example, a first skill 290a and a second skill 290b may both be configured to order food from respective restaurants. The system may store a user preference (e.g., in the profile storage 270) that is associated with the user that provided the user input to the system(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 420 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 420 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 420 may include information indicating how long it took a skill 290 to provide result data 430 to the post-NLU ranker 265. When the post-NLU ranker 265 multiple skills 290 for result data 430, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 420 to increase and decrease NLU processing confidence scores associated with various skills 290 that the post-NLU ranker 265 has already requested result data from. Alternatively, the post-NLU ranker 265 may use the other data 420 to determine which skills 290 to request result data from. For example, the post-NLU ranker 265 may use the other data 420 to increase and/or decrease NLU processing confidence scores associated with skills 290 associated with the NLU results data 485 output by the NLU component 260. The post-NLU ranker 265 may select n-number of top scoring altered NLU processing confidence scores. The post-NLU ranker 265 may then request result data 430 from only the skills 290 associated with the selected n-number of NLU processing confidence scores.

As described, the post-NLU ranker 265 may request result data 430 from all skills 290 associated with the NLU results data 485 output by the NLU component 260. Alternatively, the system(s) 120 may prefer result data 430 from skills implemented entirely by the system(s) 120 rather than skills at least partially implemented by the skill system(s) 125. Therefore, in the first instance, the post-NLU ranker 265 may request result data 430 from only skills associated with the NLU results data 485 and entirely implemented by the system(s) 120. The post-NLU ranker 265 may only request result data 430 from skills associated with the NLU results data 485, and at least partially implemented by the skill system(s) 125, if none of the skills, wholly implemented by the system(s) 120, provide the post-NLU ranker 265 with result data 430 indicating either data response to the NLU results data 485, an indication that the skill can execute the user input, or an indication that further information is needed.

As indicated above, the post-NLU ranker 265 may request result data 430 from multiple skills 290. If one of the skills 290 provides result data 430 indicating a response to a NLU hypothesis and the other skills provide result data 430 indicating either they cannot execute or they need further information, the post-NLU ranker 265 may select the result data 430 including the response to the NLU hypothesis as the data to be output to the user. If more than one of the skills 290 provides result data 430 indicating responses to NLU hypotheses, the post-NLU ranker 265 may consider the other data 420 to generate altered NLU processing confidence scores, and select the result data 430 of the skill associated with the greatest score as the data to be output to the user.

A system that does not implement the post-NLU ranker 265 may select the highest scored NLU hypothesis in the NLU results data 485. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 485 to provide result data 430 to the post-NLU ranker 265 prior to the post-NLU ranker 265 ultimately determining the skill 290 to be invoked to respond to the user input. Some of the skills 290 may provide result data 430 indicating responses to NLU hypotheses while other skills 290 may providing result data 430 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 430, associated with the skill 290 associated with the highest score, for output to the user. Alternatively, the post-NLU ranker 265 may output ranked output data 425 indicating skills 290 and their respective post-NLU ranker rankings. Since the post-NLU ranker 265 receives result data 430, potentially corresponding to a response to the user input, from the skills 290 prior to post-NLU ranker 265 selecting one of the skills or outputting the ranked output data 425, little to no latency occurs from the time skills provide result data 430 and the time the system outputs responds to the user.

If the post-NLU ranker 265 selects result audio data to be output to a user and the system determines content should be output audibly, the post-NLU ranker 265 (or another component of the system(s) 120) may cause the device 110a and/or the device 110b to output audio corresponding to the result audio data. If the post-NLU ranker 265 selects result text data to output to a user and the system determines content should be output visually, the post-NLU ranker 265 (or another component of the system(s) 120) may cause the device 110b to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110b to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110a and/or the device 110b to output audio corresponding to the output audio data.

As described, a skill 290 may provide result data 430 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 430 indicating a response to the user input, the post-NLU ranker 265 (or another component of the system(s) 120, such as the orchestrator component 230) may simply cause content corresponding to the result data 430 to be output to the user. For example, the post-NLU ranker 265 may send the result data 430 to the orchestrator component 230. The orchestrator component 230 may cause the result data 430 to be sent to the device (110a/110b), which may output audio and/or display text corresponding to the result data 430. The orchestrator component 230 may send the result data 430 to the ASR component 250 to generate output text data and/or may send the result data 430 to the TTS component 280 to generate output audio data, depending on the situation.

The skill 290 associated with the highest post-NLU ranker score may provide the post-NLU ranker 265 with result data 430 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 290, the skill 290 may provide the system with result data 430 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 430 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 430, the system may further engage a transactional skill 290 after the transactional skill 290 provides the post-NLU ranker 265 with result data 430 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 5:
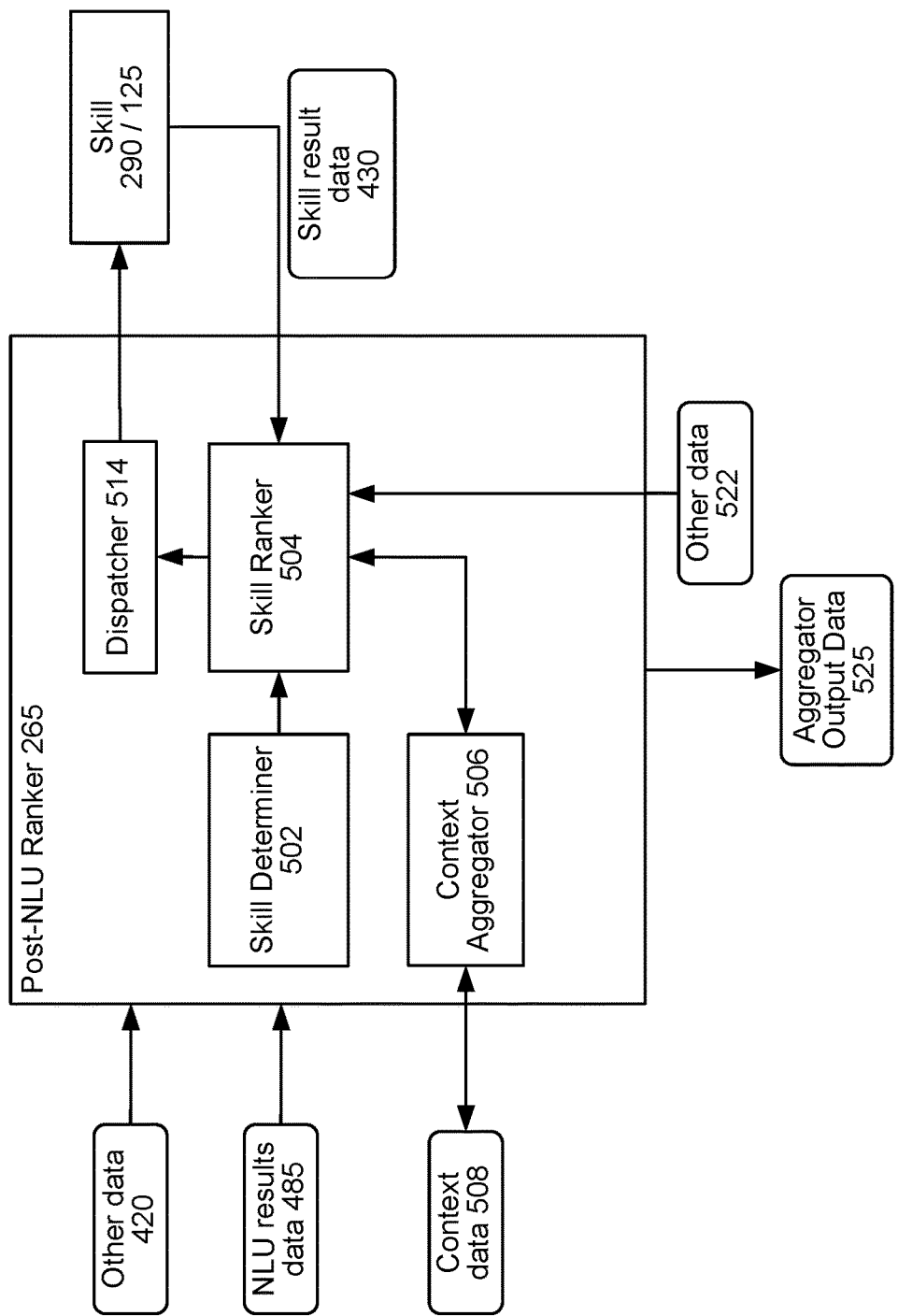
FIG. 5 is a conceptual diagram illustrating how a post-NLU ranker may process according to embodiments of the present disclosure.

FIG. 5 illustrates other configurations and operations of the post-NLU ranker 265. When the post-NLU ranker 265 receives NLU results data 485, the NLU results data 485 may be sent to a skill determiner 502. The skill determiner 502 may include information about what skills are capable of handling what intents. Such information may be context agnostic, and may thus indicate what skills are capable of handling what intents generally, without regard to the context associated with the user input. The skill determiner 502 thus receives the NLU results data 485 and identifies what particular candidate skills may handle the intent for NLU hypothesis. For example, if a NLU hypothesis includes a particular intent, the skill determiner 502 identifies each skill that may execute with respect to the intent. For further example, if the NLU results data 485 include multiple NLU hypotheses including multiple intents, the skill determiner 502 associates each different NLU hypothesis with each skill that may execute with respect to the NLU hypothesis. As illustrated, the skill determiner 502 may be implemented at part of the post-NLU ranker 265. However, one skill in the art will appreciate that the skill determiner 502 may be implemented as part of the NLU component 260 or in another component without departing from the present disclosure. In such a case, the NLU results data 485 may include intent-skill pairs.

The post-NLU ranker 265 may also include a skill ranker 504. The skill ranker 504 ranks the intent-skill pairs generated by the skill determiner 502 based on, for example, the number of filled slots of a NLU hypothesis, an NLU confidence score associated with a NLU hypothesis, context information output by a context aggregator 506, and/or other data.

The post-NLU ranker 265 may include the context aggregator 506. The context aggregator 506 receives context data 508 from various contextual sources. The context data 508 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 506 may aggregate the context data 508 and put the context data 508 in a form that can be processed by the skill ranker 504. Context data 508 may include data obtained from the device 110 or from other services connected to the system(s) 120.

The context data 508 may include skill availability data. Such information may indicate what skills are available and authorized to process the user input. For example, if the user has only enabled certain skills, the enabled skills may be noted in the skill availability data.

The context data 508 may also include dialog data. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 230, skill(s) 290, skill server(s) 125, etc. to track information across the dialog session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog session may or may not start with speaking of a wakeword. Each user input of a dialog may be associated with a unique user input identifier such that multiple user input identifiers may be associated with a single dialog session identifier.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 508 may be one portion of the data used by the skill ranker 504 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 508 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 508 (and/or other data 522) may include a metadata flag/indicator that represents whether the particular skill being executed is one that can handle a go-back (or other navigational) request.

The context data 508 may also include user profile data. The user profile data may represent preferences and/or characteristics of the user that originated the current user input. Such data may be received from the profile storage 270.

The context data 508 may also include location data. The location data may represent a location of the device 110 from which the user input was received.

The context data 508 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 508 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 508 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 508 may also include other context data not explicitly recited herein.

The skill ranker 504 may operate one or more trained models that are configured to process the NLU results data 485, skill result data 430, and other data 522 in order to determine a single best skill for executing the current user input from the available pairs output by the skill determiner 502. The skill ranker 504 may send queries to the skills and request a first skill and a second skill (for example the candidate skills identified by the skill determiner 502), to provide potential result data indicating whether the skill can handle the intent at the particular moment and if so, what the output data for the particular skill would be (e.g., data the skill would provide to a user if the skill were selected to execute the user input) based on the NLU results data 485. For example, the skill ranker 504 may send a first NLU hypothesis, associated with a first skill, to the first skill along with a request for the first skill to at least partially execute with respect to the first NLU hypothesis. The skill ranker 504 may also send a second NLU hypothesis, associated with the second skill, to the second skill along with a request for the second skill to at least partially execute with respect to the second NLU hypothesis. The skill ranker 504 receives, from the first skill, first result data 430*a* generated from the first skill's execution with respect to the first NLU hypothesis. The skill ranker 504 also receives, from the second skill, second results data 430*b* generated from the second skill's execution with respect to the second NLU hypothesis. Based on the first results data 430*a*, a first NLU confidence score associated with the first NLU hypothesis, the second results data 430*b*, a second NLU confidence score associated with the second NLU hypothesis, and other data 522 (e.g., context data, user profile data, etc.), the skill ranker 504 determines the best skill for executing the current user input. The skill ranker 504 sends an indication of the best skill to a dispatcher component 514.

The dispatcher 514 may then send the selected skill the information needed to execute the user input, including an indication of the intent, the appropriate context data 508 (such as device identifier, user identifier, or the like), slot data, utterance identifier, dialog identifier, or any other information needed.

One or more models implemented by components of the orchestrator component 230, post-NLU ranker 265, short-lister 350, or other component may be trained and operated according to various machine learning techniques.

Figure 6:
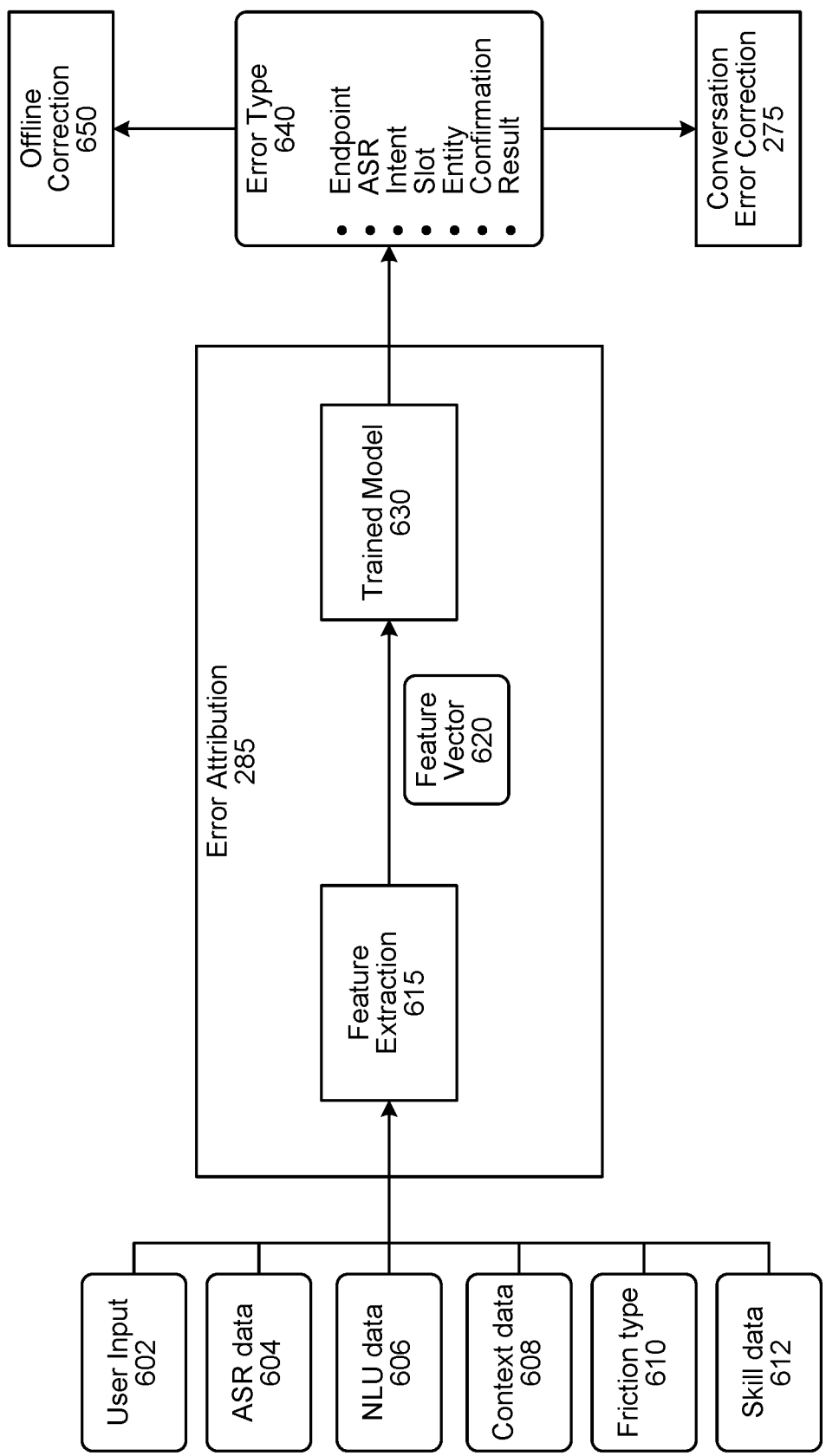
FIG. 6 is a conceptual diagram of an error attribution component to determine an error type corresponding to a user input according to embodiments of the present disclosure.

FIG. 6 is a conceptual diagram of an error attribution component 285 for determining an error type corresponding to a user input according to embodiments of the present disclosure. The error attribution component 285 may include a feature extraction component 615 and a trained model 630. The error attribution component 285 is configured to use signals and data determined during processing of a user input to determine which component of the system(s) 120 is the root cause of the error corresponding to the user input. In the case where the user input is speech, the utterances, as described above, are routed to multiple components of the system(s) 120 for processing. For example, the utterance is processed by the ASR component 250 to determine text data representing the utterance, and the text data is processed by the NLU component 260 to determine an intent of the user input and slot data relating to the intent and the user input, and the system(s) 120 determines an output responsive to the user input using the various other components described in relation to FIG. 2A. In the case where the user input is text data, the text data is routed to the NLU component 260.

As described above, the components of the system(s) 120 may include several machine learning models, rule engines and other data processing components, any of which may be the cause of the undesired result to the user input. In many cases, the components that are responsible for undesired results are the ones that perform automatic speech recognition (e.g., ASR component 250) and natural language understanding (e.g., NLU component 260). Part of natural language understanding, as described above, involves components that perform intent classification (e.g., IC component 364), slot tagging (e.g., NER component 362), and entity resolution (e.g., NER component 362). Other components of the system(s) 120 may also cause the undesired result. Determining which component is the cause of the undesired result may be challenging, since the components of the system(s) 120 may not process the data sequentially.

The error attribution component 285 may incorporate a multi-class machine learning model (e.g., trained model 630) that is trained on training data representing past user inputs that are labeled with an error type. In some embodiments, the error attribution component 285 may employ a machine learning model configured for multi-class classification (e.g., a multi-class classifier model). The multi-class classifier may be configured to classify a user input into one of the error types described herein. In some cases, the multi-class classifier may be configured to classify the user input into a no-error type/class when the error attribution component 285 determines that the user input is processed by the system(s) 120 without an error.

In some embodiments, the machine learning model may be a random forest classifier. In other embodiments, the machine learning model may be a gradient boosting classifier.

In other embodiments, the error attribution component 285 may employ a machine learning model configured for multi-label classification (e.g., multi-label classifier model). The multi-label classifier may be configured to identify one or more error types corresponding to a user input. For example, using multi-label classification, the error attribution component 285 may determine that the undesired result to the user input may be caused by an ASR error and an intent error, thus, identifying multiple components that may be responsible for the undesired result.

The error attribution component 285 may extract features, for example using the feature extraction component 615 corresponding to the processing performed by the system(s) 120. The features may be extracted using various data points/signals produced by the system(s) 120 when processing the user input. For example, as shown in FIG. 6, various data signals may be provided to the error attribution component 285. These data signals include, but are not limited to, user input 602, ASR hypotheses 604, NLU hypotheses 606, context data 608 and friction type 610. These data signals may be referred to as NLP data.

The user input 602 may include text data representing the user input to be processed by the error attribution component 285. In some embodiments, the user input 602 may also include dialog text data representing a turn-by-turn conversation between the user and the system(s) 120. The dialog text data may identify the input provided by the user and the system-generated response corresponding to the input. The user input 602 may include encoded text data and/or word embeddings corresponding to the text data. The user input 602 may also include audio data (and/or encoded audio data) representing the user input, when the user input is an utterance.

The ASR hypotheses 604 may include data relating to the ASR hypotheses generated by the ASR component 250. As described above, the ASR component 250 may generate a N-best list of ASR hypotheses corresponding to the user input represented by 602. In some embodiments, the N-best list may include the top five hypotheses determined by the ASR component 250 that may correspond to the user input. The ASR hypotheses 604 may also include the ASR score corresponding to each of the hypotheses of the N-best list. The ASR score, as described above, may indicate the ASR component's confidence level that the respective ASR hypothesis represents the user input. In some embodiments, the ASR component 250 may determine a token score corresponding to each word/token of the ASR hypothesis, and the ASR hypotheses 604 may also include the token scores.

The NLU hypotheses 606 may include data relating to the NLU hypotheses generated by the NLU component 260. As described above, the NLU component 260 may generate a N-best list of NLU hypotheses corresponding to one or more ASR hypotheses or text data representing the user input represented by 602. In some embodiments, the N-best list may include the top five NLU hypotheses determined by the NLU component 260. As described above, a NLU hypothesis includes an intent and one or more slots corresponding to the user input. The NLU hypotheses 606 may also include a NLU score corresponding to each NLU hypotheses, where the NLU score may indicate the NLU component's confidence level that the respective NLU hypothesis corresponds to the user input. The NLU hypotheses 606 may also include an intent score representing the NLU component's confidence that the intent of respective NLU hypothesis corresponds to the user input. The NLU hypotheses 606 may also include a slot score for each slot of a NLU hypothesis, where the slot score represents the NLU component's confidence that the slot corresponds to the user input.

The context data 608 may include dialog session data representing a turn-by-turn dialog between the user and the system. A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the device response. The system(s) 120 may be configured to engage in dialogs with a user and may use the dialog session identifier or other data to track the progress of the dialog to select system responses in a way that tracks the previous user-system exchanges, thus moving the dialog along in a manner that results in a desirable user experience.

The context data 608 may include information such as the dialog history (which may include user inputs, system responses, or other data relevant to the dialog), which may be used by the natural language processing system when interpreting user inputs so the system can select an appropriate response to what the user said.

The context data 608 may include other data relating to the user input determined by the system(s) 120 during processing of the input. For example, the context data 608 may include whether the user input is part of an on-going dialog session between the user and the device 110. The context data 608 may include data indicating the quality of the audio data captured by the device 110, indication of background noise, etc. The context data 608 may include a device identifier, device type corresponding to the device 110 that captures the user input, etc. The context data 608 may include user profile data relating to the user 5.

The friction type 610 may include data indicating a type of friction/error determined by one or more components, such as a skill component 290, when processing the user input. During runtime, as the system(s) 120 is processing the user input, the friction type 610 may be generated. The friction type 610 may be one of the following: coverage gap, error or retry, low confidence, no expressed intent, unsupported use-case, user action required, or other friction types. The coverage gap friction type may indicate when the system(s) 120 is unable to determine an entity value or a slot value using the data available in the system database(s). For example, a user input may be "What is the weather at Disney Land?" and the system(s) 120 is unable to determine the geographic location for which the weather is requested. The error or retry friction type may indicate when one or more components is unable to perform processing within a time period and may time-out. The low confidence friction type may indicate when one or more components generates a low confidence score for its respective processing/output data. The no expressed intent friction type may indicate that the intent classifier 364 was unable to determine the intent with a high level of confidence. The unsupported use case friction type may indicate when a domain/skill is unable to perform the requested action. For example, if the user input requests to provide an output via fax, however, the domain/skill is only able to provide an output via email. The user action required friction type may indicate when further input from the user is required for one or more components to successfully process the user input.

The skill data 612 may include various data determined by the skill component 290 and/or the skill systems 225, such as, dialog status, skill results data, entity resolution data, slot filler data, etc. The skill data 612 may also include data identifying one or more active skills for the dialog session and one or more historic skills that was active during the dialog session for previous turns. The dialog status may indicate the status of the dialog at a given time/dialog turn, and possible values include "success", "in_progress", "user_abandoned", "invalid", "system_abandoned", "fault", etc.

The feature extraction component 615 processes the various data signals described above to determine the feature vector 620 corresponding to the user input. The feature vector 620 may represent features relating to processing of the user input by the system(s) 120. In some embodiments, the feature vector 620 may include approximately 300 features. In some embodiments, the features of the feature vector 620 can be categorized into base features, ASR boosting features, intent boosting features, slot boosting features, entity recognition boosting features, and other features.

The base features may include an ASR token count (indicating the number of words/token in the ASR hypothesis selected by the system(s) 120 for further processing), NLU confidence score (indicating the confidence score associated with the NLU hypothesis selected by the system(s) 120 for further processing), ASR confidence score (indicating the confidence score associated with the ASR hypothesis selected by the system(s) 120 for further processing), and other features relating to the user input. The base features may also include a dialog outcome indication (indicating whether the dialog was successful or not; possible values include "success", "error" etc.), a dialog status code (indicating the status of the dialog at a given time/dialog turn; possible values include "success", "in_progress", "user_abandoned", "invalid", "system_abandoned", "fault", etc.), NLU confidence bin value (indicating the NLU component's confidence level for a hypothesis; possible values include "high", "medium", "low", "rule", "FST", "editorial", "postprocessrule", etc.), audio utterance ratio (indicating how much silence the input audio signal/data has; the value is determined by dividing the duration of the utterance by the duration of the entire audio signal), remaining utterance (indicating the number of dialog turns remaining in the dialog session for use in offline operations after the dialog session has ended), built in custom intent (indicating whether the top intent of the N-best list relates to a particular intent), audio initiator (indicating how the audio input is initiated, for example, using a wake word, pressing a button, tapping and releasing a button, etc.), TTS player state (indicating the state of the TTS player, whether it is outputting synthesized speech or not at a given time), utterance count (indicating the total number of utterances in the dialog session for use in offline operations), device wakeword (indicating which wakeword the device responds to, for example, "Alexa", "Amazon", any other custom wakeword, etc.), and other features.

The ASR boosting features may include an ASR minimum score (indicating the confidence score associated with the lowest ranked ASR hypothesis of the ASR N-best list), an ASR maximum score (indicating the confidence score associated with the highest ranked/top ASR hypothesis of the ASR N-best list), an ASR mean score (indicating a mean of the confidence scores associated with the N-best ASR hypotheses), a minimum slot ASR score (indicating the minimum token score determined by the ASR component 250 that is associated with a token/word representing a slot value in a ASR hypothesis of the ASR N-best list), a maximum slot ASR score (indicating the maximum token score determined by the ASR component 250 that is associated with a token/word representing a slot value in a ASR hypothesis of the ASR N-best list), a mean slot ASR score (indicating the mean of the token scores determined by the ASR component 250 that are associated with the tokens/words representing slot values in the ASR N-best list), and other features relating to ASR processing. The ASR boosting features may also include a minimum ER ASR score (indicating the minimum token score determined by the ASR component 250 that is associated with a token/word representing an entity value in a ASR hypothesis of the ASR N-best list), maximum ER ASR score (indicating the maximum token score determined by the ASR component 250 that is associated with a token/word representing an entity value in a ASR hypothesis of the ASR N-best list), a mean ER ASR score (indicating the mean token score determined by the ASR component 250 that is associated with a token/word representing an entity value in a ASR hypothesis of the ASR N-best list), and other features.

The intent boosting features may include a first intent score (indicating the intent score determined by the NLU component 260 associated with the first NLU hypothesis of the NLU N-best list), include a second intent score (indicating the intent score determined by the NLU component 260 associated with the second NLU hypothesis of the NLU N-best list), include a third intent score (indicating the intent score determined by the NLU component 260 associated with the third NLU hypothesis of the NLU N-best list), include a fourth intent score (indicating the intent score determined by the NLU component 260 associated with the fourth NLU hypothesis of the NLU N-best list), include a fifth intent score (indicating the intent score determined by the NLU component 260 associated with the fifth NLU hypothesis of the NLU N-best list), recognized with FSTs (indicating whether the intent selected by the NLU component 260 for further processing was identified using FSTs and other machine learning models employed by the NLU component 260), recognized with rules (indicating whether the intent selected by the NLU component 260 for further processing was identified using a rule engine employed by the NLU component 260), a first domain (indicating a first domain determined by the NLU component 260 corresponding to the user input), a second domain (indicating a second domain determined by the NLU component 260 corresponding to the user input), a first intent (indicating a first intent determined by the NLU component 260 corresponding to the user input), a second intent (indicating a second intent determined by the NLU component 260 corresponding to the user input), and other features relating to determining the intent corresponding to the user input. The intent boosting features may also include utterance text (including encoded text data representing an encoded utterance), domain text (including encoded text data representing the domain name), an interpretation score (indicating a score determined by the post-NLU ranker 265), an utterance score (indicating a score determined using TTS quality of a candidate utterance and how often the candidate utterance appears in the system database as a spoken utterance), a segmentation score (indicating a confidence score of the NER segmentation determined by the NER component 362), and other features.

The slot boosting features may include a minimum slot score (indicating the minimum slot score determined by the NLU component 260 for a slot of a NLU hypothesis of the NLU N-best list), a maximum slot score (indicating the maximum slot score determined by the NLU component 260 for a slot of a NLU hypothesis of the NLU N-best list), a mean slot score (indicating the mean of the slot scores determined by the NLU component 260 for the slots of the NLU N-best list), a slot count (indicating the total number of tokens/slots in the utterance), all-other tag (indicating whether all the tokens in the utterance are tagged by the NLU component 260 as "other"; possible values include "empty" when no tokens are tagged as "other", "all_other" when all the tokens are tagged as "other", "special_value" when at least one of the token is not tagged as "other", etc.), and other features relating to determining the slot(s) corresponding to the user input.

The entity recognition boosting features may include a minimum entity recognition score (indicating the minimum score corresponding to entity recognition determined by the NLU component 260 associated with a NLU hypothesis of the NLU N-best list), a maximum entity recognition score (indicating the maximum score corresponding to entity recognition determined by the NLU component 260 associated with a NLU hypothesis of the NLU N-best list), a mean entity recognition score (indicating the mean of the scores corresponding to entity recognition determined by the NLU component 260 associated with the NLU N-best list), and other features relating to entity recognition.

The other features may include a friction type indicating a type of friction experienced by the user. The friction type may be one of the following: coverage gap, error or retry, low confidence, no expressed intent, unsupported use-case, user action required, or other friction types. Details on the friction type are described with relation to friction type 610

The trained model 630 processes the feature vector 620, which may comprise the various features described above, to determine which component of the natural language processing system(s) 120 cause the error/undesired result. The trained model 630 outputs an error type 640 indicating the type of error corresponding to the user input 602. The error type 640 may indicate which component of the system(s) 120 caused the error. The trained model 630 may be configured to classify the user input into one of many error types.

In some embodiments, the error types 640 that the trained model 630 may determine include endpoint error, ASR error, intent error, slot error, an entity error, confirmation error, and result error. The endpoint error may indicate when the user input is truncated or there is an end point in the middle of a user input. For example, due to various reasons (background noise, device malfunction, user error, etc.) the device 110 or the system(s) 120 may receive a partial utterance/input, such as "play a song by" or "tell me a movie with actor George." Such an error can be propagated to other downstream components, causing the system(s) 120 to output an undesired response. Based on the feature vector 620, the trained model 630 may determine that the undesired result is due to the user input being truncated.

The ASR error may indicate that the undesired result is due to the text determined by the ASR component 250 inaccurately representing the input utterance. The intent error may indicate that the undesired result is due to the intent determined by the NLU component 260 being inaccurate. The slot error may indicate that the undesired result is due to the slot labels determined by the NLU component 260 being inaccurate. The entity error may indicate that the undesired result is due to the entity determined by the NLU component 260 being inaccurate.

The confirmation error may indicate when the interpretation of the user input by the system(s) 120 is correct, but the system(s) 120 determines to confirm the interpretation with the user rather than processing the interpretation to generate an output responsive to the user input. For example, in some cases, the system(s) 120 determines accurately that the user input is "play a song by Michael Jackson." However, instead of playing a song by Michael Jackson, the system(s) 120 responds to the user with "Do you want me to play a song by Michael Jackson?" to confirm that the system(s) 120 understood the user accurately. In such cases, the confirmation response by the system may be undesired by the user, especially if the system(s) 120 often confirms the user input.

The result error may indicate when the output generated by the system(s) 120 is incorrect, even though the text determined by ASR component 250 and the intent, slot and entities determined by the NLU component 260 is accurate. For example, the system(s) 120 may accurately determine that the user input is "what is the weather in Seattle today," but then respond with tomorrow's weather or weather for another location.

In some embodiments, the trained model 630 may output a probability distribution for each class of error type that may correspond to the user input. The probability distribution may include, for each error type, a likelihood that the user input corresponds to that error type. The trained model 630 may output a vector indicating the probabilities for each error type. For example, the trained model 630 may output <Endpoint=0.05; ASR=0.05; Intent=0.7, Slot=0.1, Entity= 0.05, Confirmation=0.0, Result=0.0>, thus, indicating that the undesired result to the user input is likely caused due to an error in determining the intent.

In some embodiments, the trained model 630 may determine that the user input does not correspond to any of the error types. In one embodiment, the trained model 630 may determine that the undesired result to the user input is caused by another component not corresponding to any of the defined error types/classes, and may classify the user input to a 'other error' type/class.

In some embodiments, the trained model 630 may be configured to determine that processing of the user input by the system(s) 120 did not result in an error, that is, the system(s) 120 generated the desired result to the user input. In this case, the trained model 630 may classify the user input as corresponding to a 'no error' type/class.

An error in one component may be propagated to other components of the system(s) 120 causing the other components to generate errors also. The trained model 630 may be configured to identify the root-cause component that caused the other components to generate an error. For example, the trained model 630 may be configured to determine that the error was caused due to the ASR component, which led the NLU component to cause errors as well. Data indicating a sequence of subcomponents in the natural language processing system may be included in the parameters of the trained model. The sequence of subcomponents may indicate the sequence in which the subcomponents are invoked/executed to process a user input. The data representing the sequence of subcomponents is configurable to correspond to the configuration of the natural language processing system. For example, the data may indicate the following sequence: ASR component, NLU component, intent classification component, entity recognizer, post-NLU ranker, skill determiner, and TTS. In another example, the data may indicate the following sequence: wakeword detection component 220, ASR component 250, acoustic model(s) 253, language model(s) 254, FST(s) 244, acoustic front end 256, speech recognition engine 258, NLU component 260, entity recognizer 362, intent classification 364, domain recognizer 363, shortlister 350, light slot filler 452, entity resolution 470, reranker 490, skill 290, post NLU ranker 265, skill determiner 502, skill ranker 504, context aggregator 506, dispatcher 514, and TTS component 280. As described herein, the error attribution component 285 may determine which one of these components may have caused the error.

The error type 640 may be provided to the conversation error correction component 275 (via the orchestrator 230 or directly). Based on the error type, the conversation error correction component 275 may determine to perform different techniques to enable the system(s) 120 to generate the desired response to the user input. For example, when the error type 640 is an ASR error, the conversation error correction component 275 may cause the system(s) 120 to request the user to repeat the utterance. In this case, the ASR component was unable to accurately determine what the user said, thus, the conversation error correction component 275 determines to have the user repeat the utterance to capture second audio data representing the utterance, and the second audio data, which may be of better quality than the initial audio data, can be processed by the ASR component 250.

As another example, when the error type 640 is an intent error, the conversation error correction component 275 may cause the system(s) 120 to confirm the user's intent. The system(s) 120 may confirm with the user the intent that the NLU component 260 determined, may confirm a second intent (the next highest scoring intent) determined by the NLU component 260, or may confirm an intent related to/similar to the intent determined by the NLU component 260.

In other cases, the conversation error correction component 275 may determine an alternate utterance that is similar to the input utterance, where the alternate utterance was successfully processed by the system(s) 120 in the past to output the desired result. The conversation error correction component 275 may confirm the alternate utterance with the user before proceeding to output a response corresponding to the alternate utterance.

Similarly, if the error type 640 is a slot error or an entity error, the conversation error correction component 275 may confirm the slot and/or entity name with the user. If the error type 640 is an endpoint error (indicating the audio signal did not capture the entire utterance/user request), then the conversation error correction component 275 may ask the user to repeat the user request/input. If the error type 640 is a confirmation error or a result error, then the data determined by the error attribution component 285 may be used in offline operations to take corrective action with respect to the component of the natural language processing system that caused the error.

The error type 640 and other data determined by the error attribution component 285 may be provided to an offline correction component 650. The offline correction component 650 may be configured to provide the error type 640 and other data to the model building component 710 or another component to retrain/update/configure the trained model 630. In some embodiments, the offline correction component 650 may be configured to determine which component/subcomponent of the natural language processing system 240 and/or the system(s) 120 is the cause of the error, and may be configured to perform corrective action, such as, updating/retraining/configuring the appropriate component so that the likelihood of producing the error in the future is reduced. In some embodiments, the offline correction component 650 may generate and manage a graphical user interface presenting a dashboard with information on the different error types, the frequency of each error type within a time period, which subcomponent of the natural language processing component 240 and/or the system(s) 120 is attributable to the error type, and other information, that a developer/system manager may use to determine which subcomponents need to be updated to reduce the likelihood of generating the error.

Figure 7:
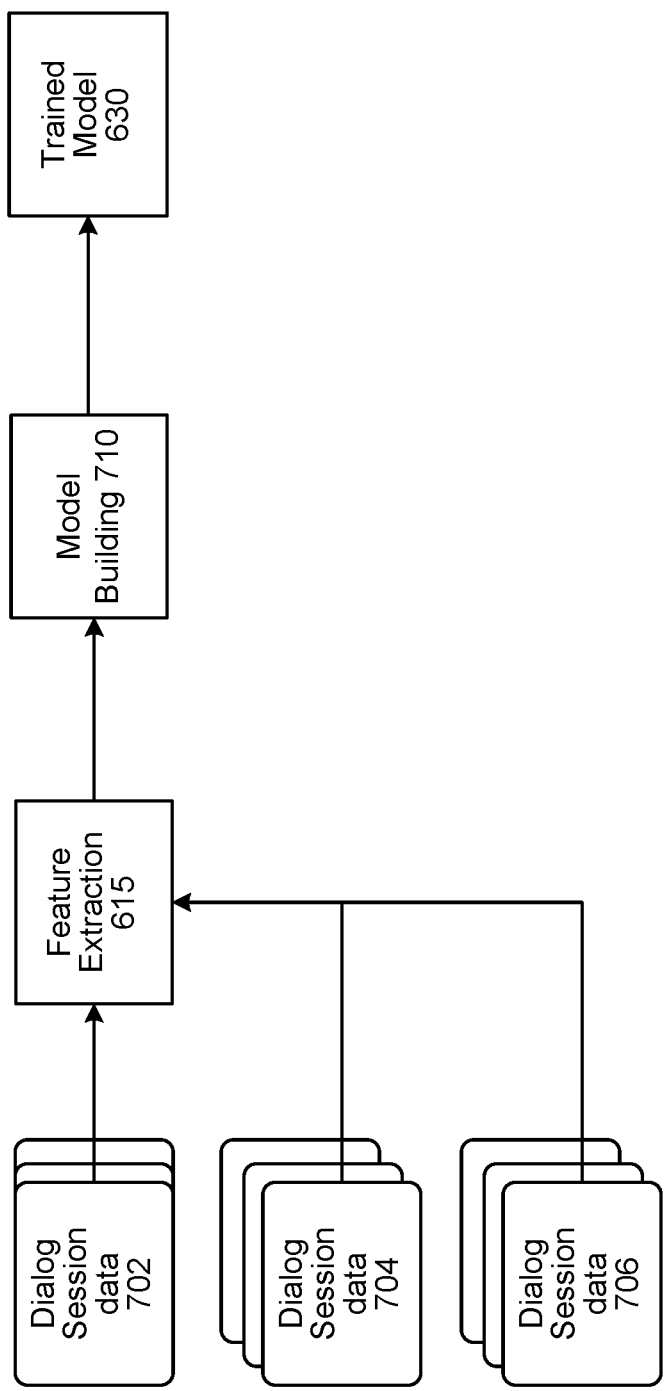
FIG. 7 is a conceptual diagram of building the trained model using training data according to embodiments of the present disclosure.

FIG. 7 conceptually illustrates components for training a machine learning model to determine a component of the system(s) 120 that is root cause of an undesired result to a user input. The error attribution component 285 may include a model building component 710. Alternatively, the model building component 710 may be a separate component included in the system(s) 120.

The model building component 710 may train one or more machine learning models to classify a user input into one of the defined error types based on the features determined during speech processing of the user input. The model building component 710 may train the one or more machine learning models during offline operations. The model building component 710 may train the one or more machine learning models using a training dataset.

The training dataset used by the model building component 710 may include dialog session data 702, 704, 706, and 708. The dialog session data includes utterance data representing system-generated data relating to a historic utterance and human annotated data relating to the historic utterance. The dialog session data 702 may include system-generated text data corresponding to an utterance, where the text data is determined by the system(s) 120 as described above with relation to ASR processing. The dialog session data 702 may also include annotated text data corresponding to the utterance, where the annotated text data is determined by a system developer/manager/human annotator. The dialog session data 702 also includes system-generated speech processing features, such as the intent, the slot labels, the entity names, etc. determined by the system(s) 120 as described above with relation to NLU processing. The dialog session data 702 may also include annotated speech processing features that are determined by the system developer/manager/human annotator. The dialog session data 702 may also include an error type identified by the system developer/manager/human annotator that resulted in an undesired response by the system(s) 120 to the historic utterance. For example, for a historic utterance "I looked at you Whitney Houston" the system-generated text data may be "I looked at you Whitney Houston." The system-generated speech processing data for the example historic utterance may be: <Domain: Knowledge; Intent: QAIntent>. The annotated speech processing data for the example historic utterance may be: <Domain: Music; Intent: PlaySong>. The error type for the example historic utterance may be identified as intent error, thus, indicating that the undesired response was a result of an error in determining the intent of the user input.

The trained model 630 may be trained as a rolling model, where the training dataset is updated on a weekly basis using data received by the system(s) 120. The dialog session data 702 may include utterance data relating to multiple historic utterances that are received by the system(s) 120 over a period of four weeks, for example week 1 to week 4. The model building component 710 uses the dialog session data 702 to train the model 630, and the system(s) 120 uses this model for processing incoming (runtime) utterances during week 5.

The dialog session data 704 may correspond to historic utterances received during another period of four weeks with three weeks overlapping the previous session data, for example, for week 2 to week 5. The model building component 710 uses the dialog session data 704 to retrain the model 630, and the system(s) 120 uses this model for processing incoming (runtime) utterances during week 6. Similarly, the dialog session data 706 may correspond to historic utterances received during the next period of four weeks, for example, for week 3 to week 6. The model building component 710 uses the dialog session data 706 to retrain the model 630, and the system(s) 120 uses this model for processing incoming (runtime) utterances during week 7.

There may be an imbalance in the training dataset due to certain error types being more frequently encountered than other error types that the trained model 630 is configured to classify. The trained model 630, in some embodiments, may be a random forest classifier or a gradient boosting classifier. The trained model 630 may be configured to perform with imbalanced training datasets.

The error attribution component 285 may be used to identify utterance data to include in the training dataset to aid in relieving the imbalance in the training dataset. For example, for incoming/runtime utterances that the error attribution component 285 identifies as corresponding to a particular error type that is under-represented in the training dataset, a system developer may select that utterance for human annotation and inclusion in the training dataset for the next week/future training of the model 630. The system(s) 120 receives a large number of utterances from a large number of users for processing, and a system developer may use the error attribution component 285 to identify particular utterances for inclusion in the training dataset.

The training dataset (e.g., dialog session data 702, 704, 706) may be processed by the feature extraction component 615 to determine the features described above in relation to FIG. 6. For example, the feature extraction component 615 may determine base features, ASR boosting features, intent boosting features, slot boosting features, entity recognition boosting features, and other features corresponding to the speech processing of the respective historic utterance represented by the dialog session data. The features determined by the component 615 may be used by the model building component 710 to generate the trained model 630.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 6, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 8:
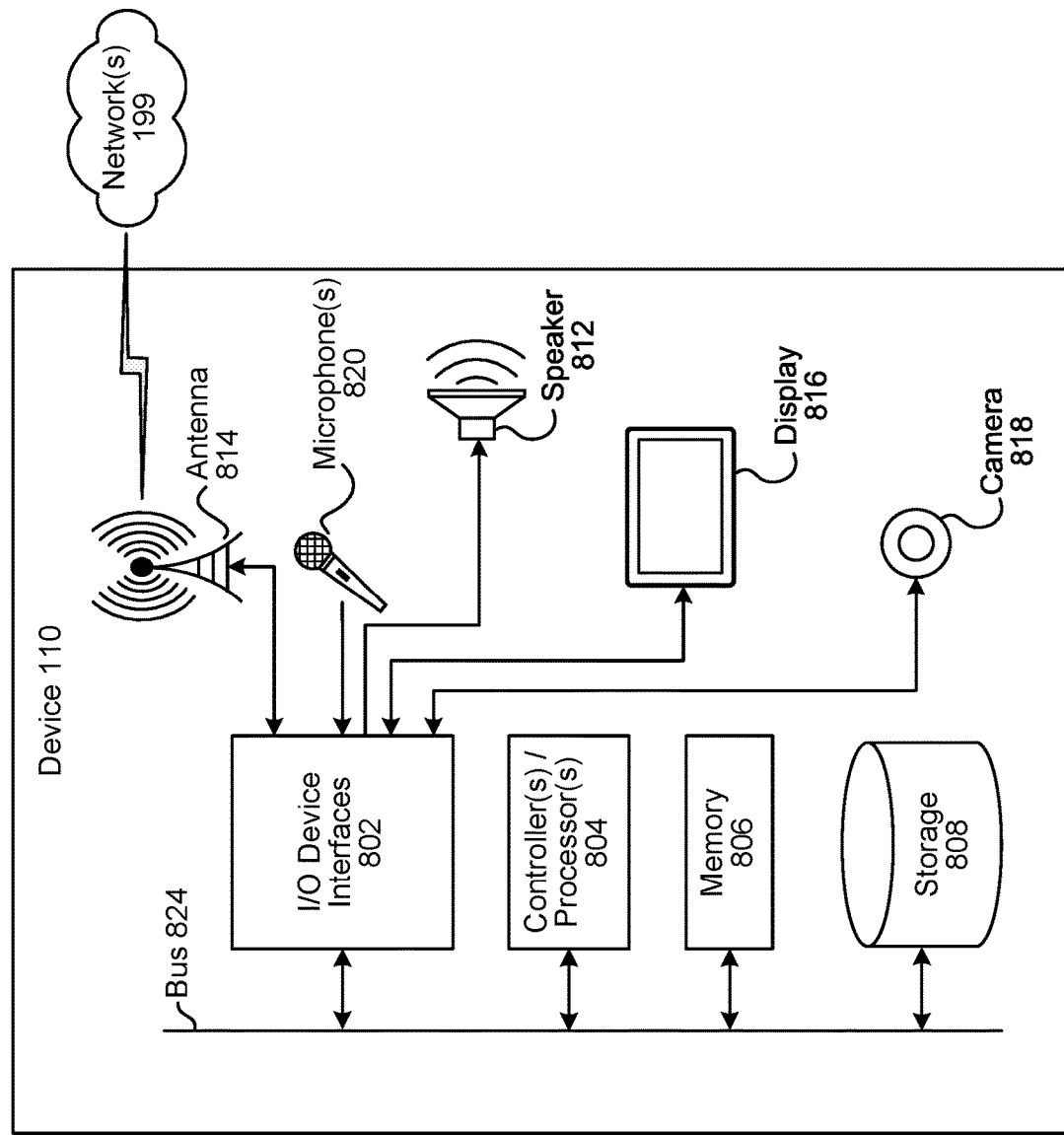
FIG. 8 is a block diagram conceptually illustrating example components of a device according to embodiments of the present disclosure.
Figure 9:
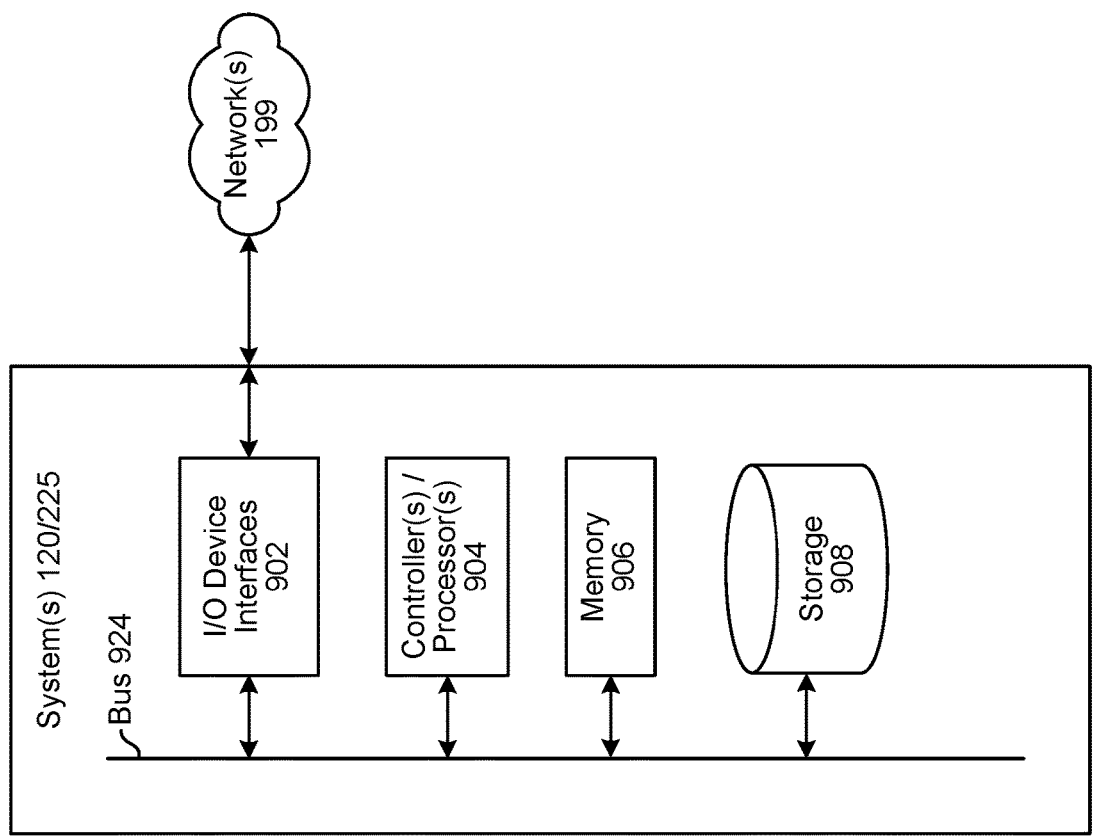
FIG. 9 is a block diagram conceptually illustrating example components of a system according to embodiments of the present disclosure.

FIG. 8 is a block diagram conceptually illustrating a device 110 that may be used with the system. FIG. 9 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (802/902), processor(s) (804/904), memory (806/906), and/or storage (808/908) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 10:
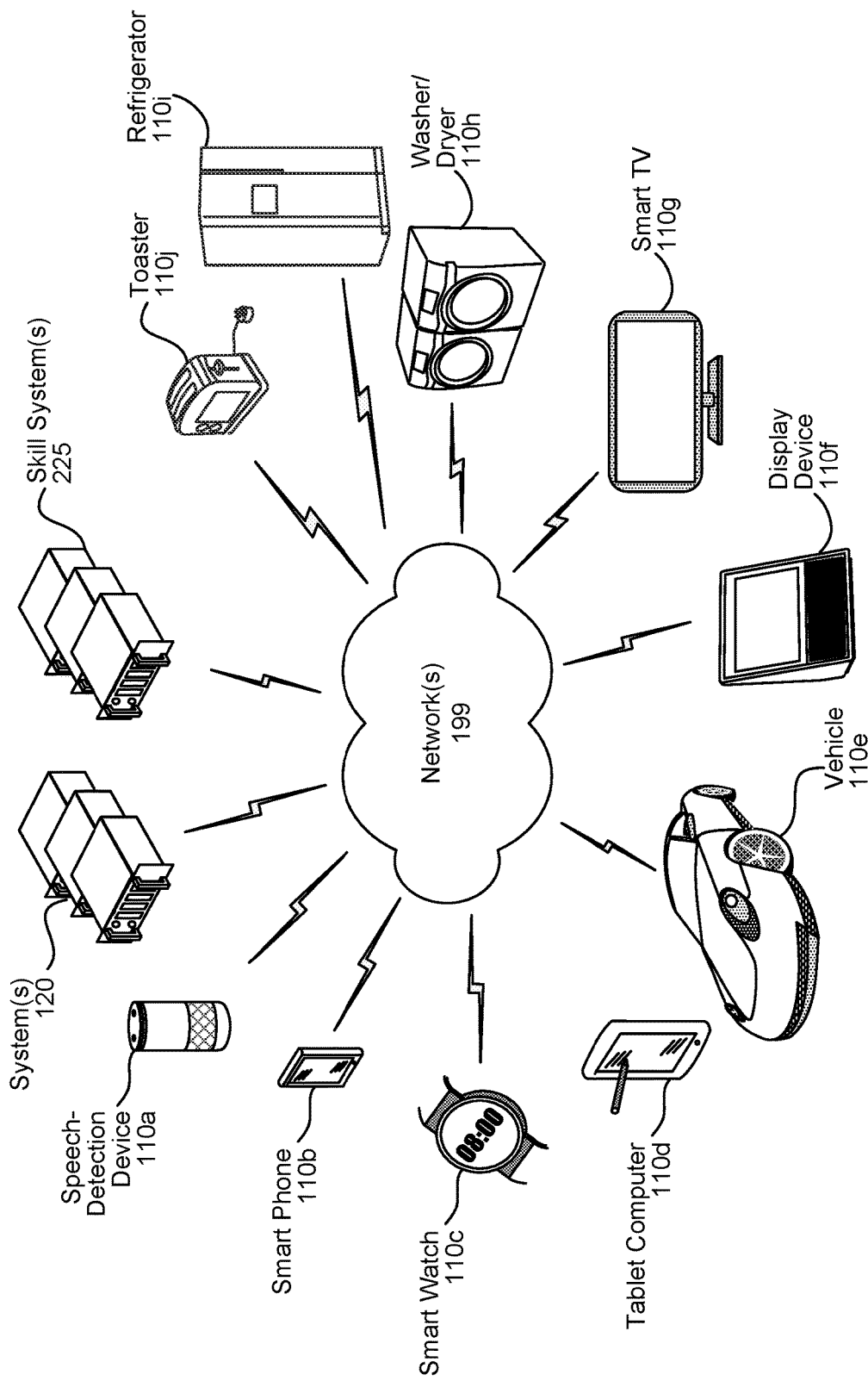
FIG. 10 illustrates an example of a computer network for use with the speech processing system.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a device, audio data corresponding to an utterance;
   processing the audio data using at least one automatic speech recognition (ASR) component to determine ASR data corresponding to the utterance;
   processing the ASR data using at least one natural language understanding (NLU) component to determine NLU data corresponding to the utterance;
   processing the ASR data and the NLU data to determine vector data representing features determined by at least one component from a plurality of components, the features corresponding to at least one of: a first ASR hypothesis, a first ASR score, a first NLU hypothesis, a first NLU score, a first intent, and a first slot value;
   determining, using a trained classifier model and the vector data, an error corresponding to the utterance, the trained classifier model configured to process the features to determine the error, wherein the error is of an error type from a plurality of error types corresponding to at least one component from the plurality of components;
   determining that the error type corresponds to intent data determined by the at least one NLU component, the intent data representing the first intent;
   processing the first intent to determine a second intent similar to the first intent;
   determining, using first data representing the utterance, second data representing an alternative utterance corresponding to the second intent;
   determining third data including the second data and a request to confirm use of the alternative utterance for further processing;
   processing, using text-to-speech (TTS) processing, the third data to determine output audio data; and
   sending the output audio data to the device.

2. The computer-implemented method of claim 1, further comprising:
   receiving, from the device, second audio data corresponding to a second utterance;
   processing the audio data using the at least one ASR component to determine second ASR data corresponding to the second utterance;
   processing the second ASR data using the at least one NLU component to determine second NLU data corresponding to the second utterance;
   processing the second ASR data and the second NLU data to determine second vector data representing features determined during natural language processing of the second audio data;
   processing, using the trained classifier model, the second vector data to determine a second error type corresponding to the second utterance;
   determining that the second error type corresponds to data determined by the at least one ASR component;
   generating output data representing a request to repeat the second utterance;
   processing, using TTS processing, the output data to determine second output audio data; and
   sending the second output audio data to the device.

3. The computer-implemented method of claim 1, further comprising:
   processing the ASR data to determine an ASR slot score corresponding to a first portion of the ASR hypothesis representing a slot;
   processing the ASR data to determine an ASR entity score corresponding to a second portion of the ASR hypothesis representing an intent;
   processing the NLU data to determine an intent score corresponding to a NLU hypothesis representing the utterance;
   processing the NLU data to determine an NLU slot score corresponding to the NLU hypothesis;
   processing the NLU data to determine an NLU entity score corresponding to the NLU hypothesis; and
   determining the vector data using at least the ASR slot score, the ASR entity score, the intent score, the NLU slot score, and the NLU entity score.

4. The computer-implemented method of claim 1, further comprising:
  determining dialog session data including fourth data representing a previous utterance and fifth data representing a previous system-generated response to the previous utterance;
  processing the dialog session data to determine encoded dialog session data;
  determining a dialog outcome corresponding to the previous utterance;
  processing the first data to determine encoded utterance data;
  processing the audio data to determine audio features; and
  determining the vector data using at least the encoded dialog session data, the dialog outcome, encoded utterance data, and the audio features.

5. A computer-implemented method comprising:
  receiving audio data corresponding to an utterance;
  processing the audio data using a natural language processing (NLP) system comprising a plurality of components to determine NLP data;
  determining, using the NLP data, feature data representing processing, corresponding to the utterance, by one or more of the plurality of components;
  determining, using the feature data, a first error type corresponding to processing of the utterance, the first error type determined from a plurality of error types corresponding to the NLP system;
  determining the first error type indicates a first component of the plurality of components; and
  determining, based on the first error type, that the first component corresponds to an undesired response.

6. The computer-implemented method of claim 5, further comprising:
  determining that automatic speech recognition (ASR) data determined by the first component representing the utterance caused the undesired response;
  determining that the first component is configured to perform automatic speech recognition;
  generating output data representing a request to repeat the utterance;
  processing, using text-to-speech (TTS) processing, the output data to determine output audio data; and
  sending the output audio data to a device that received the audio data.

7. The computer-implemented method of claim 5, further comprising:
  determining that intent data determined by the first component corresponding to the utterance caused the undesired response;
  determining that the first component is configured to perform intent classification;
  generating output data representing an alternative utterance corresponding to the utterance;
  processing, using TTS processing, the output data to determine output audio data; and
  sending the output audio data to a device that received the audio data.

8. The computer-implemented method of claim 5, further comprising:
  determining that entity data determined by the first component corresponding to the utterance causes the undesired response;
  determining that the first component is configured to perform entity recognition;
  generating output data representing a request to confirm an entity name;
  processing, using TTS processing, the output data to determine output audio data; and
  sending the output audio data to a device that received the audio data.

9. The computer-implemented method of claim 5, further comprising:
  processing the NLP data to determine an ASR confidence score corresponding to an ASR hypothesis corresponding to the utterance;
  processing the NLP data to determine an ASR slot score corresponding to a first portion of the ASR hypothesis representing a slot;
  processing the NLP data to determine an ASR entity score corresponding to a second portion of the ASR hypothesis representing an intent; and
  determining the feature data using at least the ASR confidence score, the ASR slot score, and the ASR entity score.

10. The computer-implemented method of claim 5, further comprising:
  processing the NLP data to determine an intent score corresponding to a NLU hypothesis corresponding to the utterance;
  processing the NLP data to determine an NLU slot score corresponding to the NLU hypothesis;
  processing the NLP data to determine an NLU entity score corresponding to the NLU hypothesis; and
  determining the feature data using at least the intent score, the NLU slot score, and the NLU entity score.

11. The computer-implemented method of claim 5, further comprising:
  determining dialog session data representing a previous utterance and a previous system-generated response to the previous utterance;
  processing the dialog session data to determine encoded dialog session data;
  determining a dialog outcome corresponding to the previous utterance;
  processing ASR data representing the utterance to determine encoded utterance data; and
  determining the feature data using at least the encoded dialog session data, the dialog outcome, and the encoded utterance data.

12. The computer-implemented method of claim 5, further comprising:
  processing the audio data to determine audio features;
  determining an audio utterance ratio representing a ratio of a first duration corresponding to the audio data and a second duration corresponding to a portion of the audio data representing the utterance;
  determining a wakeword represented in the audio data; and
  determining the feature data using at least the audio features, the audio utterance ratio, and the wakeword.

13. A system comprising:
  at least one processor; and
  at least one memory including instructions that, when executed by the at least one processor, cause the system to:
    receive audio data corresponding to an utterance;
    process the audio data using a natural language processing (NLP) system comprising a plurality of components to determine NLP data;
    determine, using the NLP data, feature data representing processing, corresponding to the utterance, by one or more of the plurality of components;

determine, using the feature data, a first error type corresponding to processing of the utterance, the first error type determined from a plurality of error types corresponding to the NLP system;

determine the first error type indicates a first component of the plurality of components; and determine, based on the first error type, that the first component corresponds to an undesired response.

14. The system of claim 13, wherein the instructions that, when executed by the at least one processor, further cause the system to:

determine that automatic speech recognition (ASR) data determined by the first component representing the utterance caused the undesired response;

determine that the first component is configured to perform automatic speech recognition;

generate output data representing a request to repeat the utterance;

process, using text-to-speech (TTS) processing, the output data to determine output audio data; and send the output audio data to a device that received the audio data.

15. The system of claim 13, wherein the instructions that, when executed by the at least one processor, further cause the system to:

determine that intent data determined by the first component corresponding to the utterance caused the undesired response;

determine that the first component is configured to perform intent classification;

generate output data representing an alternative utterance corresponding to the utterance;

process, using TTS processing, the output data to determine output audio data; and send the output audio data to a device that received the audio data.

16. The system of claim 13, wherein the instructions that, when executed by the at least one processor, further cause the system to:

determine that entity data determined by the first component corresponding to the utterance causes the undesired response;

determine that the first component is configured to perform entity recognition;

generate output data representing a request to confirm an entity name;

process, using TTS processing, the output data to determine output audio data; and send the output audio data to a device that received the audio data.

17. The system of claim 13, wherein the instructions that, when executed by the at least one processor, further cause the system to:

process the NLP data to determine an ASR confidence score corresponding to an ASR hypothesis corresponding to the utterance;

process the NLP data to determine an ASR slot score corresponding to a first portion of the ASR hypothesis representing a slot;

process the NLP data to determine an ASR entity score corresponding to a second portion of the ASR hypothesis representing an intent; and determine the feature data using at least the ASR confidence score, the ASR slot score, and the ASR entity score.

18. The system of claim 13, wherein the instructions that, when executed by the at least one processor, further cause the system to:

process the NLP data to determine an intent score corresponding to a NLU hypothesis corresponding to the utterance;

process the NLP data to determine an NLU slot score corresponding to the NLU hypothesis;

process the NLP data to determine an NLU entity score corresponding to the NLU hypothesis; and determine the feature data using at least the intent score, the NLU slot score, and the NLU entity score.

19. The system of claim 13, wherein the instructions that, when executed by the at least one processor, further cause the system to:

determining dialog session data representing a previous utterance and a previous system-generated response to the previous utterance;

processing the dialog session data to determine encoded dialog session data;

determining a dialog outcome corresponding to the previous utterance;

processing ASR data representing the utterance to determine encoded utterance data; and determining the feature data using at least the encoded dialog session data, the dialog outcome, and the encoded utterance data.

20. The system of claim 13, wherein the instructions that, when executed by the at least one processor, further cause the system to:

process the audio data to determine audio features;

determine an audio utterance ratio representing a ratio of a first duration corresponding to the audio data and a second duration corresponding to a portion of the audio data representing the utterance;

determine a wakeword represented in the audio data; and determine the feature data using at least the audio features, the audio utterance ratio, and the wakeword.

* * * * *